(12) United States Patent
Van de Velde et al.

(10) Patent No.: US 7,374,082 B2
(45) Date of Patent: May 20, 2008

(54) APPARATUS AND METHOD FOR INTEGRATED PAYMENT AND ELECTRONIC MERCHANDISE TRANSFER

(75) Inventors: Eddy L. H. Van de Velde, Leuven (BE); David A. Roberts, Warrington (GB); Patrik Smets, Nijlen (BE)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 11/478,185

(22) Filed: Jun. 29, 2006

(65) Prior Publication Data

US 2007/0012763 A1  Jan. 18, 2007

Related U.S. Application Data

(60) Provisional application No. 60/699,015, filed on Jul. 13, 2005.

(51) Int. Cl.
*G06K 5/00* (2006.01)
(52) U.S. Cl. .................................... 235/380; 235/382
(58) Field of Classification Search ............... 235/380, 235/382, 383, 384; 705/44, 41, 26
See application file for complete search history.

(56) References Cited

U.S. PATENT DOCUMENTS

| | | | |
|---|---|---|---|
| 6,101,477 A | 8/2000 | Hohle et al. | |
| 6,119,945 A * | 9/2000 | Muller et al. | 235/492 |
| 6,375,084 B1 | 4/2002 | Stanford et al. | |
| 6,398,110 B1 * | 6/2002 | Kikuchi | 235/384 |
| 6,402,038 B1 | 6/2002 | Stanford et al. | |
| 2001/0018660 A1 | 8/2001 | Sehr | |
| 2002/0147907 A1 | 10/2002 | Ross | |
| 2004/0238624 A1 * | 12/2004 | Nakano et al. | 235/380 |
| 2006/0049258 A1 | 3/2006 | Piikivi | |

FOREIGN PATENT DOCUMENTS

NL              930 1902           6/1995

* cited by examiner

*Primary Examiner*—Daniel Stcyr
(74) *Attorney, Agent, or Firm*—Ryan, Mason & Lewis, LLP; Leonardo Renna; Paul J. Otterstedt

(57) ABSTRACT

Payment transactions using a payment infrastructure are efficiently combined with e-merchandise transactions using an e-merchandise infrastructure, while allowing each infrastructure to concentrate on its primary function. An electronic payment device configured according to the payment infrastructure is interrogated by a payment module (also configured according to the payment infrastructure) of a first terminal to obtain financial data. Electronic merchandise-related information is generated by an electronic merchandise module (configured according to the electronic merchandise infrastructure) of the first terminal, and such information is transferred to the electronic payment device within a transaction conducted in accordance with the financial data and the payment infrastructure.

38 Claims, 14 Drawing Sheets

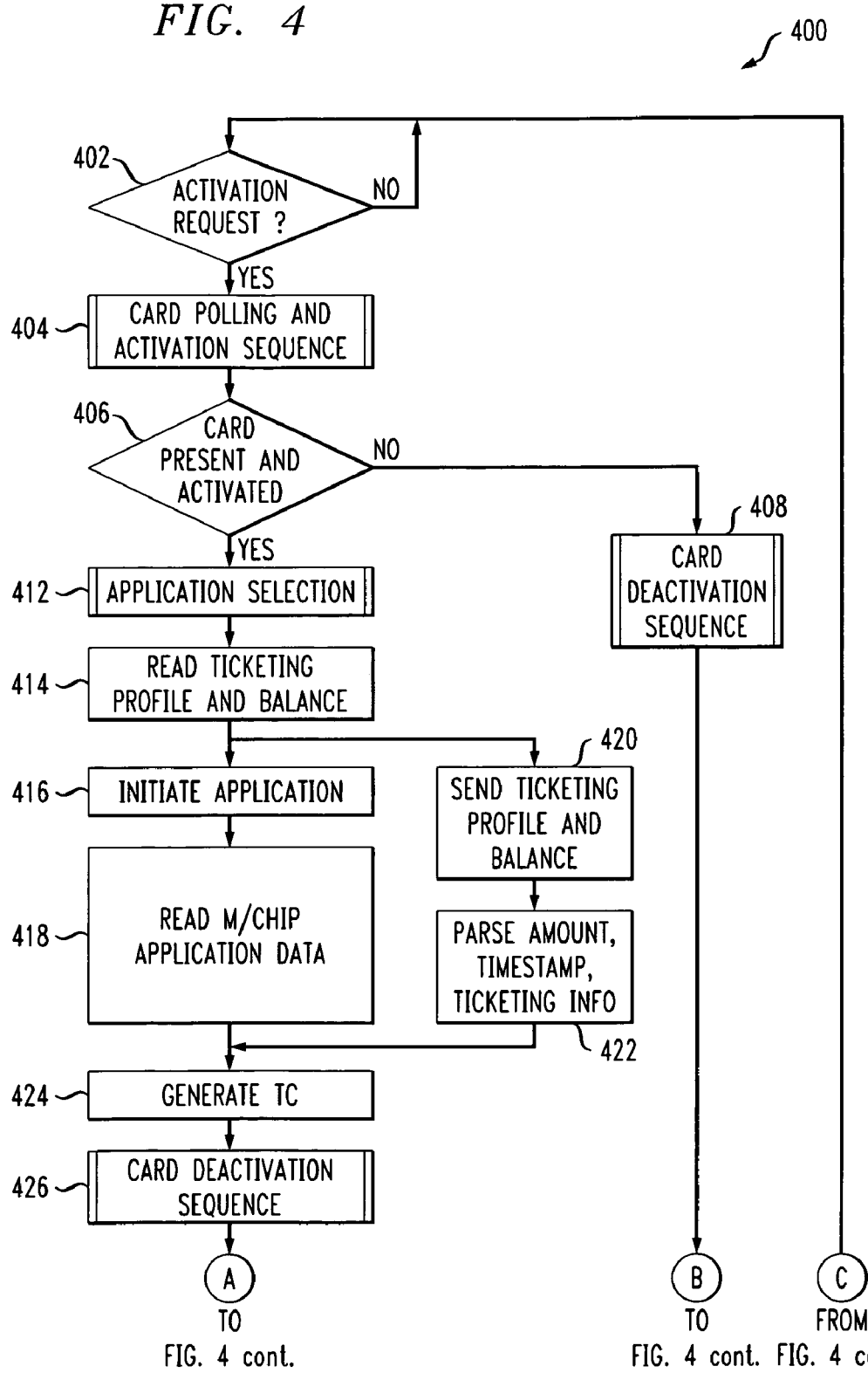

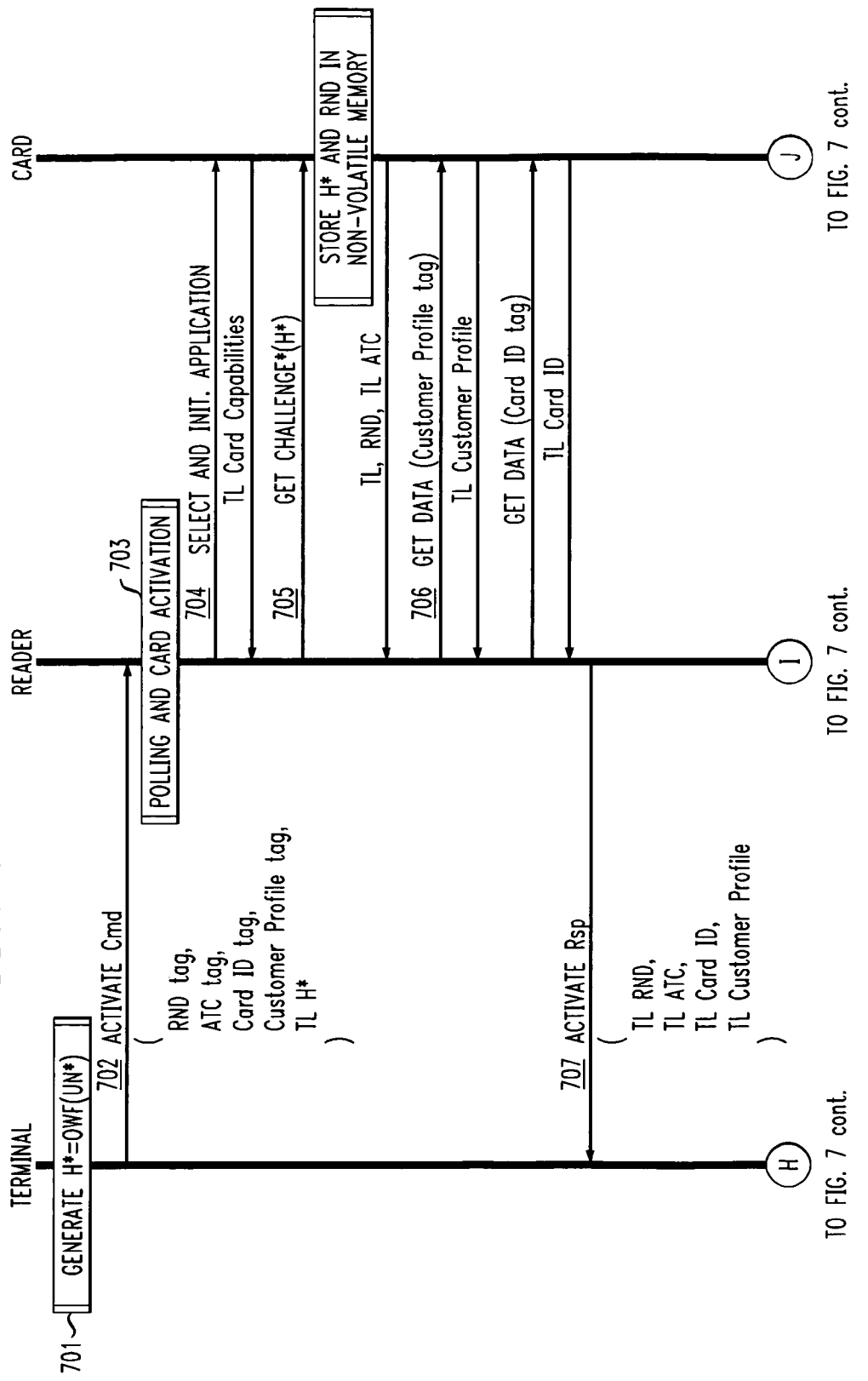

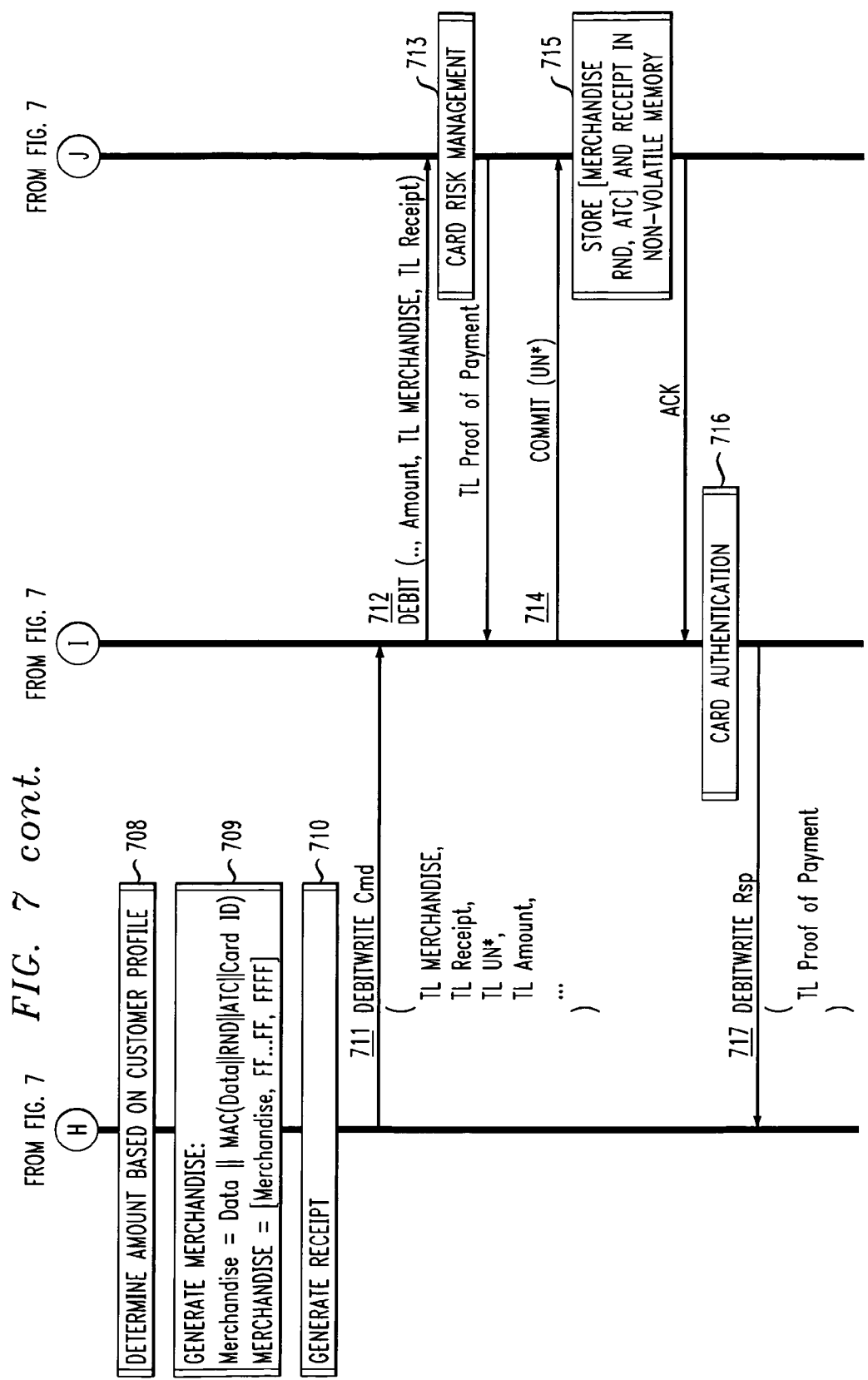

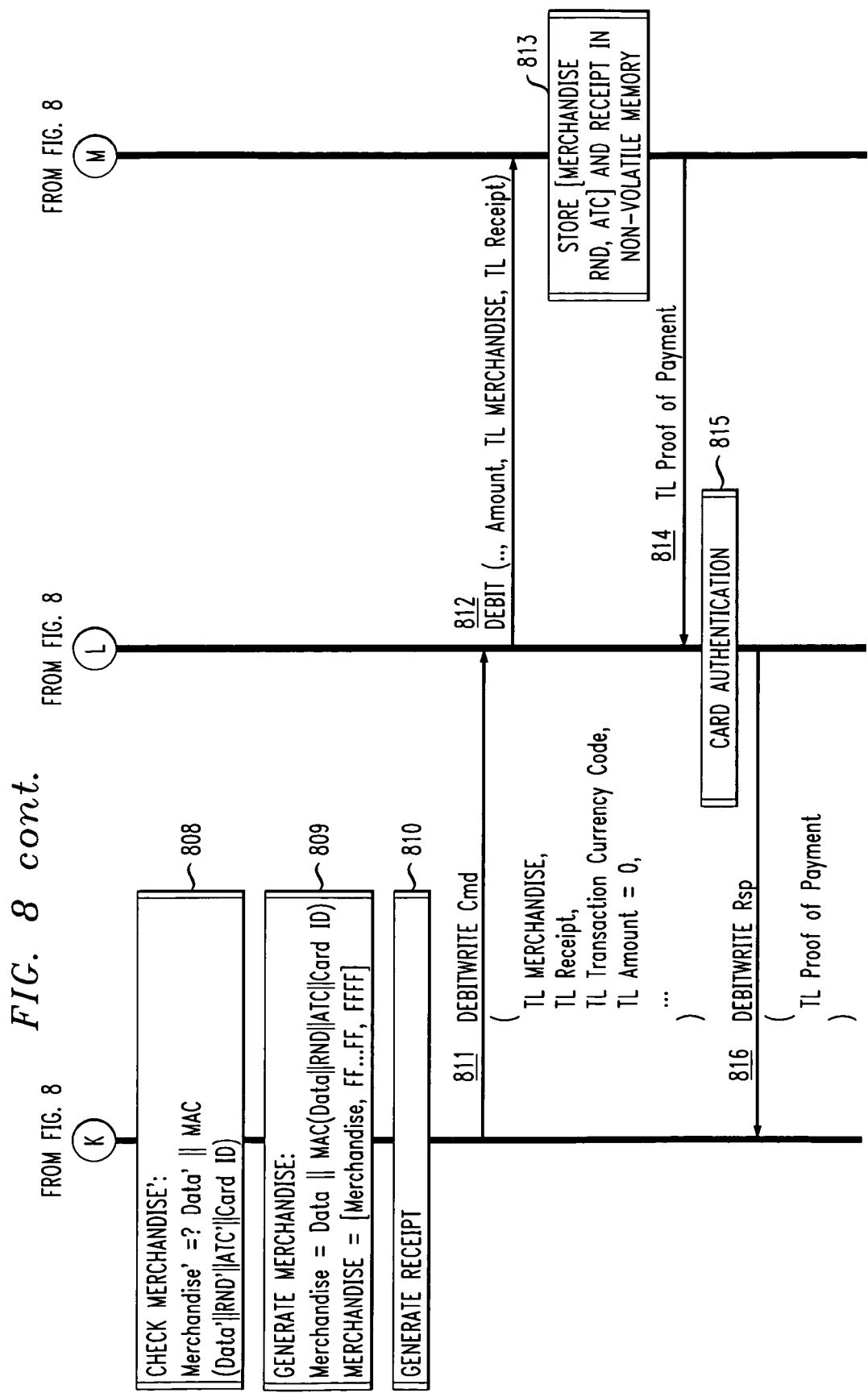

APPARATUS AND METHOD FOR INTEGRATED PAYMENT AND ELECTRONIC MERCHANDISE TRANSFER

CROSS-REFERENCE TO RELATED APPLICATIONS

This patent application claims the benefit of United States Provisional Patent Application Ser. No. 60/699,015 filed on Jul. 13, 2005, and entitled "Ticketing Extended Contactless Payment Device." The disclosure of the aforementioned Provisional Patent Application Ser. No. 60/699,015, including the complete appendix thereof, is expressly incorporated herein by reference in its entirety.

FIELD OF THE INVENTION

The present invention relates generally to the electronic and computer arts, and, more particularly, to apparatus and methods for electronic payments and electronic merchandise transfer.

BACKGROUND OF THE INVENTION

Typically, payment transactions and delivery of electronic merchandise (also known as "e-merchandise"; the terms are used interchangeably herein) are handled by separate infrastructures. For example, a payment transaction may be conducted using a payment card or other payment device, together with an infrastructure that handles only the payment. Similarly, delivery of e-merchandise (for example, electronic tickets, tokens, digital credentials, movies, music, loyalty points, benefit coupons, vouchers, data, a cryptographic key or "unlock" code, and similar non-physical items) is handled by a separate, perhaps complimentary, infrastructure which may invoke the payment infrastructure in order to charge for the goods as a separate process.

Netherlands Patent Application No. NL9301902, published Jun. 1, 1995, of Nederland PTT, discloses a method for the acquisition of the right to a specific facility by means of a smart card. The acquisition of the right is performed via a terminal and a control system. The right to the facility can be an access or a usage right. A smart card or other registration device is used to aid the access. The smart card is used not only to pay for the required facility, but as a registration and validation means to replace paper tickets. Thus, the same smart card can be used for the purchase of the right to a future facility, for the payment thereof, and for the subsequent use of the facilities, that is, the exercise of the purchased right.

U.S. Pat. No. 6,375,084 of Stanford et al., issued Apr. 23, 2002, describes card charging systems. A host ticket facility is operable by both credit cards usable at a card read/write device and concessionary payment cards usable at a contactless card reader, and a security and transaction device located between the card readers and the host facility stores in separate storage devices full fares and concessionary fares which the host facility is able to calculate. A card charging system is described, having one or more card readers and a security and transaction device connected between the card readers and a host facility for transmitting information back to a clearing center. U.S. Pat. No. 6,402,038 of Stanford et al., issued Jun. 11, 2002, appears to be similar to the Stanford et al. '084 reference just described.

U.S. Pat. No. 6,101,477 of Hohle et al., issued Aug. 8, 2000, discloses methods and apparatus for a travel-related multi-function smart card. In one embodiment, the smart card system includes a card holder identification application and various additional applications useful in particular travel contexts, for example, airline, hotel, rental car and payment-related applications. Memory space and security features within specific applications provide partnering organizations, such as airlines, hotel chains, and rental car agencies, the ability to construct custom and secure file structures.

U.S. Patent Publication No. 2006/049258 of Piikivi, published Mar. 9, 2006, discloses a wireless communication device providing a contactless interface for a smart card reader. A wireless terminal including a smart card application host, such as a contact smart card or the terminal or a terminal security component, and including a terminal interface, and also including a smart card router that enables RF communication with a contactless card reader in a ticketing system is provided. The smart card application host does not contain a contactless interface. The smart card router includes an RF antenna, separate from and external to the smart card application host, as well as a modulator/demodulator and a card access module and router for routing communication traffic arriving via the RF antenna to either the smart card application host or to the terminal interface, based on information included in the arriving communication traffic.

U.S. Patent Application Publication No. 2002/0147907 of Ross, published Oct. 10, 2002, is directed to a system for authorizing transactions using specially formatted smart cards. The transaction system includes the use of a fixed data structure that allows multiple point-of-sale systems to recognize and access a transaction card regardless of upper-level user interfaces. The smart card includes a memory with a defined data file structure, and the data file structure includes at least one read-only field, at least one encrypted read/write field, and at least one non-encrypted read/write field. The smart card can be utilized in a transaction system and the smart card authorization device interacts with a defined data file structure provided on the smart card.

United States Patent Application Publication No. 2001/0018660 of Sehr, published Aug. 30, 2001, is directed to an electronic ticketing system and methods utilizing multi-service visitor cards. A plurality of entities are encompassed, such as an event organizer, admission center, service providers and a visitor population, so as to automatically compile, issue, utilize and process ticketing cards for the admission to leisure and entertainment events, and for other card-based entitlements. The portable ticketing cards are realized by smart credit and/or debit card technology and have the ability to store in the card a computerized ticket template or electronic credit points, or to deduct from the card a monetary value or award points previously loaded onto the card. Biometrics identification of card holders, as well as cryptographic certification of card data and database information, can optionally be encoded into the cards, and can be verified and validated at various point-of-service locations upon presentation of the card for admission and for other services.

Prior art techniques inefficiently employ separate and unlinked payment and e-merchandise (e.g., ticketing) infrastructures and transactions.

It would be desirable to overcome the deficiencies of prior art techniques.

SUMMARY OF THE INVENTION

Principles of the present invention provide techniques that permit the efficient combination of payment transactions using a payment infrastructure with e-merchandise transactions using an e-merchandise infrastructure, while allowing each infrastructure to concentrate on its primary function, typically without the necessity for detailed understanding and incorporation of the other infrastructure. Thus, provision of tickets or other e-merchandise can be linked to a transaction, such as a payment transaction. An exemplary embodiment of a method (which can be computer-implemented) according to one aspect of the invention, includes the steps of facilitating interrogation of an electronic payment device by a first terminal to obtain financial data, facilitating generation of e-merchandise related information, and facilitating transfer of the e-merchandise related information. The electronic payment device can be interrogated by a first terminal, so as to obtain financial data and optionally profile data pertaining to a holder of the electronic payment device. The electronic payment device can be configured according to a payment infrastructure. The first terminal can have a first terminal payment module configured according to the payment infrastructure and a first terminal electronic merchandise module configured according to an electronic merchandise infrastructure and coupled to the first terminal payment module. The interrogation of the electronic payment device can be performed by the first terminal payment module.

The generation of the e-merchandise-related information can be done by the first terminal electronic merchandise module, and the transfer of the e-merchandise related information to the electronic payment device can be done by the first terminal payment module. The transfer of the e-merchandise-related information is done within a transaction that is conducted in accordance with the financial data and the payment infrastructure. Where the optional profile data is obtained, the e-merchandise related information can be generated based on the profile data.

In another aspect, an exemplary embodiment of a terminal for integrated payment and electronic merchandise transfer can include a payment module and an electronic merchandise module that is coupled to the payment module. The payment module can be configured according to the payment infrastructure and the electronic merchandise module can be configured according to the electronic merchandise infrastructure. The modules can be configured to facilitate the steps described above.

An exemplary embodiment of an electronic payment device (such as a card or appropriately-configured cellular phone), according to another aspect of the invention, can include a memory and at least one processor coupled to the memory. The processor can be operative to facilitate performance of one or more of the method steps described herein. One or more method steps of the present invention can be implemented in the form of an article of manufacture comprising a machine readable medium that contains one or more programs that when executed implement such step or steps.

One or more techniques of the present invention can provide one or more of the following substantial beneficial technical effects. These can include, for example, allowing for the close coupling of separate infrastructures, such as, for example, electronic payment and ticketing, while still respecting the separation of functions and responsibilities of each. Further, in another aspect, one or more inventive techniques allow extending rather than replacing existing payment protocols, in such a way that the extensions remain compatible with other parts of the existing payment infrastructure. Yet further, in an exemplary embodiment conforming to the EMV payment standard as discussed more fully below, a payment card application can remain compliant with all relevant open standards and the relevant type approval processes can remain applicable.

Still further, in yet another aspect, by closely coupling payment and data handling and/or storage functionality, the extension of open scheme payments, such as credit card payments, can be facilitated into environments where traditionally only tickets or closed scheme payments, such as prepaid transport cards, have been accepted. Because payment and data handling and/or storage can, if desired, be implemented in a single application on a payment card, transaction time and complexity can be greatly reduced; in particular, as opposed to employing separate card applications for payment and data handling and/or storage, and especially for high-speed contactless operations such as mass transit ticketing and payment, transaction time can be substantially reduced as compared to prior art techniques. Yet further, the complexity of the card management process can be substantially reduced since only a single card application need be managed, and multiple electronic merchandise applications can be supported without change. Even further, complexity of terminals can be reduced, since ticketing and other e-merchandise processing need not "understand" the payment side, and payment processing need not "understand" e-merchandise functionality (i.e., functionality of each side can remain substantially unmodified). In yet another aspect, one or more inventive techniques can permit combination of payment and electronic merchandise delivery in a single step, in such a way that the payment transaction and the delivery of e-merchandise, such as a permit to travel, are closely bound, thus minimizing the risk of payment without delivery or of delivery without payment, and in such a way that multiple payment for the same e-merchandise or unintended multiple delivery of merchandise for a single payment can typically be avoided.

These and other features and advantages of the invention will become apparent from the following detailed description of illustrative embodiments thereof, which is to be read in connection with the accompanying drawings.

BRIEF DESCRIPTION OF THE DRAWINGS

FIG. 7 shows exemplary data flows for purchasing and storing e-merchandise, including exemplary security features;

DETAILED DESCRIPTION OF PREFERRED EMBODIMENTS

Figure 1:
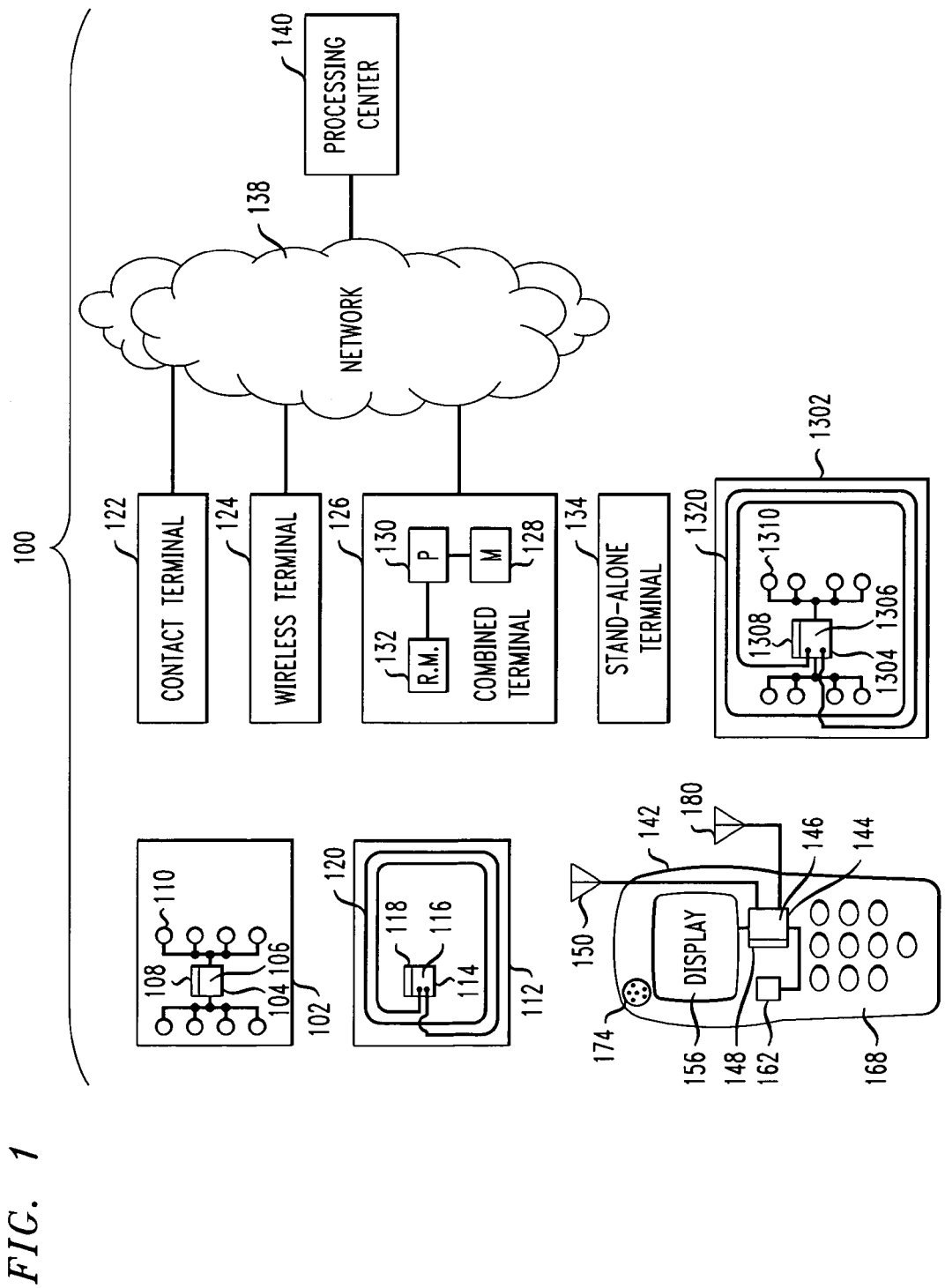
FIG. 1 shows an example of a system and various components thereof that can implement techniques of the invention.

Attention should now be given to FIG. 1, which depicts an exemplary embodiment of a system 100 together with various possible components of the system. System 100 can implement inventive techniques, and can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed with techniques of the present invention. In one or more embodiments of the invention, a dual-interface device 1302 is employed. Device 1302 is shown larger than devices 102, 112 for illustrative convenience but can have a similar form factor. Device 1302 includes an IC chip 1304 having a processor portion 1306 and a memory portion 1308. A plurality of electrical contacts 1310, similar to contacts 110, can be provided, as well as an antenna 1320 similar to antenna 120, together with an oscillator or oscillators, and/or additional appropriate circuitry for one or more of modulation, demodulation, downconversion, and the like, as described with regard to device 112. Appropriate firmware to manage the two available interfaces can be provided, with operation otherwise being similar to devices 102, 112. The description of devices, elements or components 102, 104, 106, 108, 110, 112, 114, 116, 118, 120 throughout this document are equally applicable to the corresponding items 1302, 1304, 1306, 1308, 1310, 1320. Memories 108, 118, 148 (discussed below) and 1308 may further be divided into non-volatile and volatile memory.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory units 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN"). The memory portions or units 108, 118 can store the operating system of the cards 102, 112. The operating system loads and executes applications and provides file management or other basic card services to the applications. In some embodiments, one or more applications may "sit" directly on hardware, e.g., may be outside the domain of the operating system. One operating system that can be used to implement the present invention is the MULTOS® operating system licensed by StepNexus Inc. Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications as described herein. At present, one preferred standard to which such applications may conform is the EMV payment standard set forth by EMVCo, LLC (http://www.emvco.com). It will be appreciated that, strictly speaking, the EMV standard defines the behavior of a terminal; however, the card can be configured to conform with such EMV-compliant terminal behavior and in such a sense is itself EMV-compliant. It will also be appreciated that applications in accordance with the present invention can be configured in a variety of different ways.

As noted, cards 102, 112 are examples of a variety of payment devices that can be employed with techniques of the present invention. The primary function of the payment devices may not be payment, for example, they may be cellular phone handsets, or access cards for a public transportation system, that implement techniques of the present invention. Such devices could include cards having a conventional form factor, smaller or larger cards, cards of different shape, key fobs, personal digital assistants (PDAs), appropriately configured cell phone handsets, or indeed any device with the processing and memory capabilities to implement techniques of the present invention. The cards, or other payment devices, can include memories 108, 118 and processors 106, 116 coupled to the memories. Optionally, body portions (e.g., laminated plastic layers of a payment card, case or cabinet of a PDA, chip packaging, and the like) are associated with memories 108, 118 and processors 106, 116. The memories 108, 118 can contain applications as described herein. The processors 106, 116 can be operative to execute one or more method steps to be described herein. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, or a combined terminal 126. Note that "contactless" and "wireless" are used in an interchangeable fashion herein and that the skilled artisan is familiar with the meaning of such terminology. Combined terminal 126 is designed to interface with either type of device 102, 112. Terminals may be contact terminals with plug-in contactless readers. Combined terminal 126 can include a memory 128, a processor portion 130, and a reader module 132. Note that the principles of construction of terminal 126 are applicable to other types of terminals and are described in detail for illustrative purposes. Reader module 132 can be configured for contact communication with card or device 102, or contactless communication with card or device 112, or both (different types of readers can be provided to interact with different types of cards e.g., contacted or contactless). Terminals 122, 124, 126 can be connected to a processing center 140 via a computer network 138. Network 138 could include, for example, the Internet, or a proprietary network. Processing center 140 can include, for example, a host computer of an issuer of a payment device. One or more distinct networks can be employed. As discussed below, inventive terminals can have payment modules coupled to electronic merchandise modules; the modules can be implemented in software, firmware, and/or hardware. In one or more embodiments, the modules may be software modules running on the same processor.

Stand-alone terminal 134 is representative of a terminal that is not connected to a computer network (either not connected at a particular time, or not connected at all, by design), and is otherwise generally similar to the other terminals described.

An appropriately configured cellular telephone handset 142 can also be employed in system 100. Handset 142 is depicted in semi-schematic form in FIG. 1, and can include one or more IC chips such as chip 144 including a processing unit 146 and a memory unit 148. Wireless communication with a terminal can be provided via antenna 150 or with a second antenna 180 similar to above-described antenna 120 (i.e., the handset could have a second antenna for the payment application). Note that antenna 180 is depicted schematically, but could be, e.g., a coil antenna as used in a typical "smart" card. Handsets 142 can each be equipped with a suitable display 156. Further, an appropriate power supply 162 can also be provided. Such power supplies can include, for example, a battery and appropriate circuitry. The display and power supply can be interconnected with the processor portion. Different types of portable payment devices can combine or "mix and match" one or more features depicted on the exemplary devices in FIG. 1.

In one aspect of the present invention, an electronic payment device, which may be portable, is provided for facilitating transactions by a user with a terminal, such as 122, 124, 126, 134, of a system such as system 100. The device can include a processor, for example, the processing units 106, 116, 146 discussed above. The device can also include a memory, such as memory portions 108, 118, 148 discussed above, that is coupled to the processor. Further, the device can optionally include a communications module that is coupled to the processor and configured to interface with a terminal such as one of the terminals 122, 124, 126, 134. The communications module can include, for example, the contacts 110 or antennas 120, 150, 180 together with appropriate circuitry (such as the aforementioned oscillator or oscillators and related circuitry) that permits interfacing with the terminals via contact or wireless communication. The processor of the apparatus can be operable to perform one or more steps of methods and techniques described herein. The processor can perform such operations via hardware techniques, and/or under the influence of program instructions stored in one of the memory units. The portable device can include a body portion. For example, this could be a laminated plastic body (as discussed above) in the case of "smart" cards 102, 112, or the handset chassis and body in the case of handset 142.

It will be appreciated that the terminals 122, 124, 126, 134 are examples of terminal apparatuses for interacting with portable payment devices in accordance with one or more exemplary embodiments of the present invention. The apparatus can include the aforementioned payment and electronic merchandise modules, implemented, e.g., via a processor such as processor 130, a memory such as memory 128 that is coupled to the processor, and a communications module such as 132 that is coupled to the processor and configured to interface with the portable apparatuses 102, 112, 142. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138.

The above-described devices 102, 112 are preferably ISO 7816-compliant contact cards or devices or NFC (Near Field Communications) or ISO 14443-compliant proximity cards or devices. In operation, card 112 can be touched or tapped on the terminal 124 or 128, which then contactlessly transmits the electronic data to the proximity IC chip in the card 112 or other wireless device.

Figure 2:
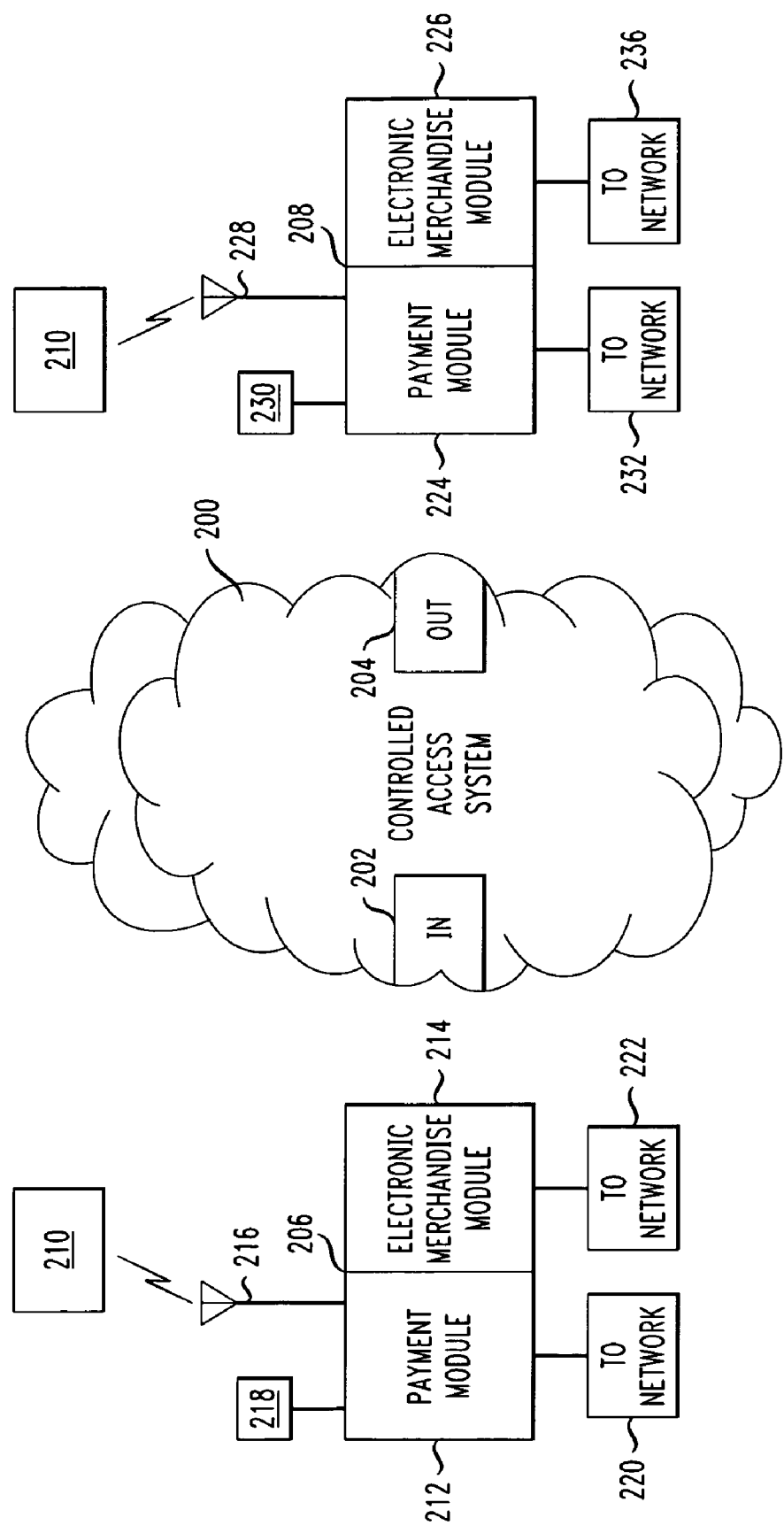
FIG. 2 shows one specific exemplary application of inventive techniques to a controlled access system.

FIG. 2 shows an exemplary application of techniques of the invention to a controlled access system, in accordance with one aspect of the invention. The system 200 can be, for example, a transportation vehicle, a complete transportation infrastructure including one or more railroad stations or bus terminals, an amusement park, a museum, and the like. System 200 may have an entrance point 202 and an exit point 204. A first terminal 206 can be located adjacent entrance point 202 and a second terminal 208 can be located adjacent exit point 204. It will be appreciated that there may be multiple entry and exit points, and that each may be provided with an appropriate terminal. The terminals, such as terminal 206, can be configured for integrated payment and electronic merchandise transfer via a payment infrastructure, in associated with an electronic merchandise infrastructure, and in conjunction with an electronic payment device, such as device 210, that is configured according to the payment infrastructure. The device 210 can be, for example, a contacted card, a contactless card, a cell phone, or other device as described above.

Terminal 206 can include a payment module 212 that is configured according to the payment infrastructure and that is also configured to interrogate the electronic payment device 210 to obtain financial data. Further, terminal 206 can include an electronic merchandise module 214 that is configured according to the electronic merchandise infrastructure and coupled to the payment module 212. The electronic merchandise module 214 can be configured to facilitate processing of e-merchandise related information, for example, ticketing information. The payment module 212 can be further configured to facilitate transfer of the e-merchandise related information to the electronic payment device 210, in a transaction conducted in accordance with the financial data and the payment infrastructure. Note that the payment module can include an antenna 216 for contactless communication (appropriate modulation and conversion circuitry, well known in the art and similar to that discussed above, can also be included). Further, the payment module can include a reader for contacted cards, 218. Note that the reader 218 and antenna 216 can be separate entities or can be integrated with the terminal 206 (e.g., payment module 212 thereof) as desired. Payment module 212 and electronic merchandise module 214 can have network connections 220, 222. It will be appreciated that if desired, a single network connection could be provided. The connection can be to any type of network described above with regard to FIG. 1, and the different modules can be connected to the same or different networks as desired. Elements 224, 226, 228, 230, 232, 236 of terminal 208 can function similarly to corresponding elements 212, 214, 216, 218, 220, 222 of terminal 206.

In one or more embodiments, payment module 212 need not itself be connected to a network and network communication can be accomplished via merchandise module 214. Further, in one or more embodiments, communication with the card or other payment device is handled by payment module 212, and any data that needs to be passed between the card and the merchandise module 214 is handled by the payment module 212 (for both contacted and contactless cards).

By way of an example to aid understanding of the skilled artisan, one example of a payment infrastructure is the EMV infrastructure, i.e. a payments system incorporating EMV, such as that operated by MasterCard International Inc. in conjunction with Issuers, Acquirers, and Merchants. Further, one example of an electronic merchandise infrastructure is an Automatic Fare Collection (AFC) system.

Optionally, payment module 212 can be further configured to interrogate the electronic payment device 210 to obtain profile data pertaining to a holder of the electronic payment device. In this case, the electronic merchandise module 214 of the first terminal 206 can be configured to process the e-merchandise related information based on the profile data. The processing of the e-merchandise related information can include generating, reading, and/or updating the e-merchandise related information. It will be appreciated that different types of e-merchandise modules 214 are possible. For example, there may be some which only generate e-merchandise, such as ticket vending machines, there may be some which only read e-merchandise, for example, a portable device of a train conductor or other ticket inspector; and there may be those which only update e-merchandise, for example, a ticket validation machine. Further, there may be combined modules which do some or all of the foregoing in any combination. It is to be emphasized that by way of example, many aspects of the invention are illustrated with regard to a ticketing system, for example, for transportation. However, this is purely exemplary, and techniques of the present invention can be employed in many applications, wherever integration of payment and e-merchandise infrastructures will be beneficial, such as, e.g., controlling access to amusement parts, museums and the like.

Modules 212, 214, 224, 226 as described can include, e.g., two physically separate devices, a single device comprising two discrete sub-devices, a single device comprising two discrete virtual devices (i.e. software modules) and a single fully integrated device doing both jobs.

Figure 3:
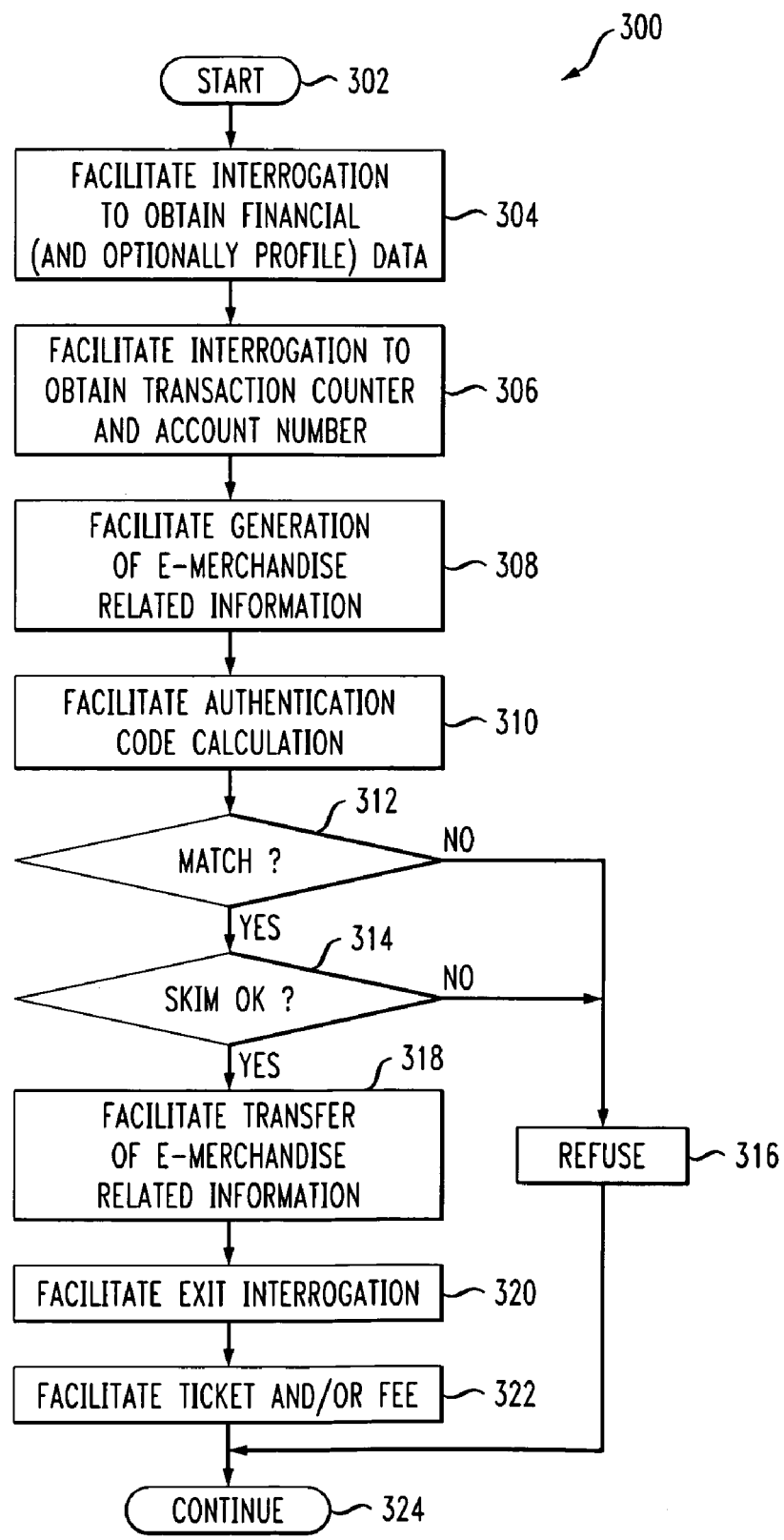
FIG. 3 is a flowchart of exemplary method steps according to an aspect of the invention.

Attention should now be given to FIG. 3, which presents a flowchart 300 of exemplary method steps according to an aspect of the invention. The method, which can be computer-implemented, can be employed for integrated payment and electronic merchandise transfer via a payment infrastructure in association with an electronic merchandise infrastructure. The e-merchandise can be of the kind described above. After beginning at block 302, block 304 includes facilitating interrogation of an electronic payment device by a first terminal to obtain financial data. The financial data can be, for example, an account number of the electronic payment device. The electronic payment device can be configured according to the payment infrastructure, and the first terminal can have a payment module and an electronic merchandise module as described above with regard to FIG. 2. The interrogation of the electronic payment device can be performed by the first terminal payment module. Optionally, in the step of facilitating interrogation 304, profile data pertaining to a holder of the electronic payment device can be obtained. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

As noted, the financial data can be, for example, an account number associated with the payment device. By way of example and not limitation, the profile data could include information such as the fact that the person is a student or a senior citizen who is entitled to a lower fare. Further, two or more categories of profile data could be provided. For example, one category could include ticketing profile data, such as senior citizen or student status. Further, card member profile data could also be provided; such data might not be needed for the transaction. This could include, for example, when and where the card member joined, personal information such as the size of clothing, and the like. Where the profile data is obtained, the e-merchandise related information can be generated by the first terminal electronic merchandise module based on the profile data.

Optional step 306 will be discussed below. Step 308 can include facilitating generation of e-merchandise related information by the first terminal electronic merchandise module. Such information could include, for example, ticketing information. Optional steps 310 through 316 will be discussed below. Step 318 can include facilitating transfer of e-merchandise related information to the electronic payment device, via the first terminal payment module, within a transaction conducted in accordance with the financial data and the payment infrastructure. In one or more embodiments, the transaction may be a payment transaction. It should be appreciated, however, that the transaction may be for zero value, and/or might only be a subset of a full payment transaction flow.

As noted, the profile data that can optionally be obtained in step 304 can include information identifying the holder of the electronic payment device as a member of a class having one or more of a plurality of entitlement categories that are associated with the class membership. The entitlement categories can relate to the electronic merchandise; for example, such categories could include entitlements to discounts or privileges. As noted, on one exemplary embodiment, the entitlement categories may include transportation fare categories, and the e-merchandise related information may include transportation ticket information.

As noted, techniques of the invention may be used to control entrance to and/or exit from a controlled access system. In some cases, one may only be concerned with entrance to the system. This may be appropriate, for example, when a single fixed fee is charged for access, such as entrance to a museum or amusement, or in mass transportation systems, such as the New York subway system, where a single fare is charged for passage between any two stations. However, in other applications, it may be desirable to also control exit, and/or to link the ticket or cost information to both the entrance and exit points. This could correspond, for example, to a system such as the London Underground or Washington D.C. Metro. Thus, the steps described could be executed in connection with entrance of the holder to a controlled access system, and in such case, the e-merchandise related information in steps 308 and 318 could include the initial entry point information. Thus, the fist terminal, such as terminal 206 in FIG. 2, can in this case be thought of as an entrance terminal. In this case, additional steps can include step 320, namely, facilitating interrogation of the electronic payment device by an exit terminal upon exit of the holder from the system, to obtain system entry point information (the exit terminal in essence already "knows" its own location, i.e., the system exit location). The exit terminal could be, for example, terminal 208 of FIG. 2. Step 322 can include facilitating one or more of providing a ticket to the holder and charging a fee to the holder, via the exit terminal payment module, based upon the controlled access system entry point information and controlled access system exit point information (e.g., location of the exit terminal). It will be appreciated that the ticket provided in step 322 (or elsewhere herein) could be an electronic ticket, a physical ticket, an optical ticket, and the like.

In one or more embodiments, the entrance and exit terminals 206, 208 may be different. For example, in a transportation system, such as a subway, metro or underground system, the first, or entrance terminal 206 could be located at a station where a person boarded a train, while the second or exit terminal 208 could be located at a station where a person exited a train. However, it is possible that the entrance and exit terminals may in fact be the same terminal. This could occur, for example, on a bus, where fares depended on how far one traveled. The exit terminal, which would be the same as the entrance terminal, could obtain information about how far one traveled by, for example, global positioning system (GPS) or other suitable techniques. The electronic payment device employed with the method depicted in FIG. 3 can be, for example, a contactless radio frequency (RF) proximity card, a contacted card, or a dual-interface card having both contactless radio frequency (RF) and contacted interfaces. Furthermore, the device could have a non-card form factor such as, for example, a cellular telephone, a PDA, a key fob, and the like; all that is required is that the appropriate capabilities be present to interface with the terminal.

It will be appreciated that in one or more exemplary embodiments, it may be desirable to provide appropriate security features, to minimize the chance of fraud or improper usage. Specific examples will now be provided within the context of a ticketing application. When an open data store is used for a ticket, the card or other device may not provide any security services to the ticketing application with regard to data storage. In this case, the ticketing application will need to address attacks such as skimming (i.e. copying a ticket to another card) or replay. However, in other embodiments, the card or other device could provide appropriate security support. One way would be to employ a transaction counter, such as the application transaction counter (ATC) in the PutData operation, in conjunction with the PutData command, to prevent the attacks. Note that the example is provided within the context of the aforementioned EMV specification. The skilled artisan, with the teachings presented in this application in hand, will be able to readily adapt the example to other types of systems and standards.

More specifically, the reader (or reader portion of a terminal) could ask for the ATC and the primary account number (PAN). The ticketing module could include the ATC and PAN in the message authentication code (MAC) that it calculates, and could pass this back to the card or other device using the PutData command. The PutData command would refuse to accept the storage of the data, unless the PAN and ATC matched its current values. This would stop replay onto a legitimate card by the card holder. Further, use of the PAN in conjunction with the combined data authentication (CDA) feature present in EMV could reduce or eliminate the chances of "skimming," i.e., where someone attempts to read valid ticket data from another card and copy it onto their own card. As the MAC includes the PAN and the PAN is signed by CDA, the payment module can detect that fraudulent attempt and refuse the transaction.

With reference to FIG. 3, where it is desired to implement security techniques, optional step 306 can include facilitating the interrogation of the electronic payment device, by the first terminal, to obtain a transaction counter and an account number, such as, for example, the aforementioned ATC and PAN. Step 310 can include facilitating calculation of an authentication code using the transaction counter and the account number; the code can be, for example, the MAC. Step 312 can include facilitating the determination whether the transaction counter and the account number obtained from the electronic payment device match the transaction counter and the account number included in the authentication code. If they do not, as indicated by the NO branch of block 312, refusal of storage of the authentication code by the electronic payment device can be facilitated, as shown at block 316. Such refusal is responsive to the determining step revealing that the transaction counter and the account number obtained from the electronic payment device do not match those included in the authentication code. Implementing these steps can reduce the likelihood of a replay fraud. If the match is acceptable, as indicated by the YES branch of block 312, optionally, skimming detection can be facilitated at decision block 314, based on the account number and a unique data authentication signature associated with the transaction, for example, the EMV signature method known as Combined DDA/AC Generation, more commonly referred to as "CDA". Thus, chances of replay (attempting to copy previously legitimate ticketing data back onto the original card) and skimming (attempts to copy legitimate ticketing data onto another authentic or fraudulent card) can be substantially reduced or eliminated. It will be appreciated that the replay and skimming prevention steps can be performed in any order, and need not be performed together; either or both can be performed, or neither. Indeed, in general, the steps depicted in FIG. 3 can be performed in any appropriate order, and not all the steps need be carried out in any particular situation. Once a refusal has been generated in block 316, processing proceeds to continue block 324.

In another approach exemplary of many possible approaches to security enhancement, steps can include facilitating interrogation of an electronic payment device by a first terminal to obtain a transaction counter such as an ATC, an electronic payment device identifier such as Card ID, and an electronic payment device-generated random number such as RND, and facilitating calculation of an authentication code such as MAC based on the e-merchandise related information, the transaction counter, the electronic payment device identifier, and the electronic payment device-generated random number. These steps permit facilitating detection of replay fraud via the transaction counter and the payment device-generated random number, as well as facilitating skimming detection, based on linkage of the e-merchandise related information to the electronic payment device identifier. Further details will be provided below with regard to FIGS. 7 and 8.

By way of review, one or more embodiments of the invention can provide techniques for combining payment and e-merchandise infrastructures and/or transactions while allowing each to concentrate on its primary function, and with little or no need for one to understand or incorporate the other. Thus, in one or more aspects, the invention can provide techniques for incorporating data handling operations into a transaction, such as a payment transaction. In one particular exemplary implementation, the payment transaction employs the aforementioned EMV standard.

Thus, techniques of the present invention permit the processing of non-payment data within a transaction, such as a payment transaction. In one or more exemplary embodiments, data handling can be conducted within such a transaction. As discussed with regard to FIG. 2, terminals can include e-merchandise and payment modules; these can be implemented as separate hardware modules or separate software modules. In one or more embodiments, two separate applications are provided, one for e-merchandise such as ticketing, and one for payments. The device, such as a card, only needs to "know" how to interface with the payment portion. The e-merchandise data, such as ticketing, can be conveyed to the card or other device through the payment application or other type of payment module. Appropriate ticketing or other e-merchandise data can be stored on the card or other device, but using the payment infrastructure preexisting on the card. In one or more embodiments, the existing payment infrastructure can be in accordance with the aforementioned EMV specification. Standard EMV commands can be used to move non-payment data, such as e-merchandise data. However, the card or other payment device can be made downward-compatible, so that it can be readily employed for ordinary purchase transactions. Further specific examples showing application of techniques of the invention within the EMV framework will now be presented with respect to FIGS. 4-6.

Figure 4:
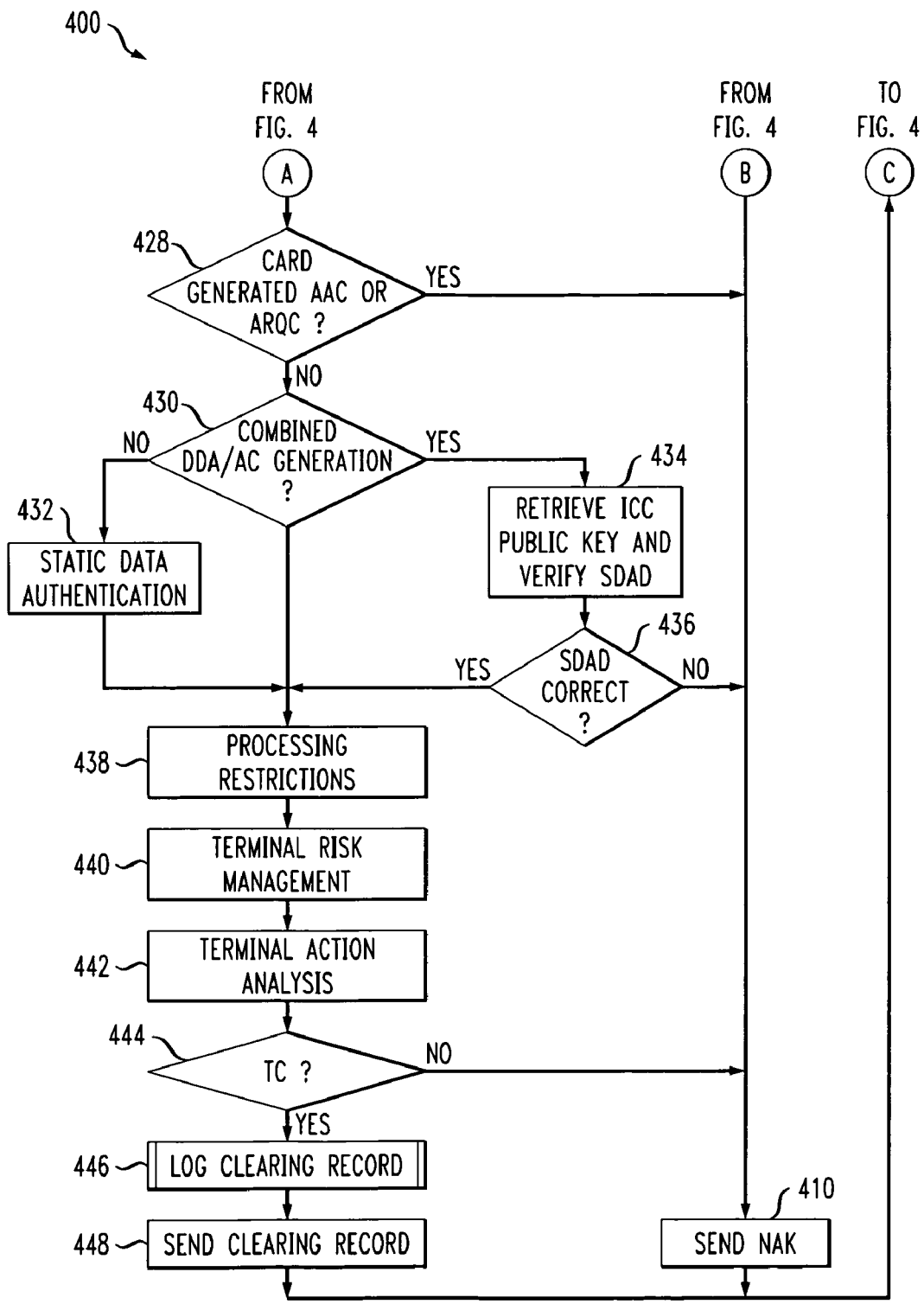
FIG. 4 is a specific exemplary flowchart showing an exemplary transaction flow at the entry of a system for payment at the entry to the system.

In the following discussion of FIGS. 4-8, "reader" encompasses an element such as payment module 212 with elements 216 and/or 218, while "terminal" encompasses an element such as e-merchandise module 214. FIG. 4 shows exemplary method steps in a transaction flow at the entry to a controlled access system, where payment is to be made at the entry. The steps are described in the context of the aforementioned EMV standard, with appropriate modifications implementing techniques of the invention. The techniques are applicable to both contactless and contacted applications. As shown in step 402 of flowchart 400, an activation request can be sent from a ticketing application to a payment application. An appropriate card polling and activation sequence can be conducted at step 404. If an invalid card or multiple cards are present, as determined at step 406, a card deactivation sequence can be run at step 408, and a "NAK" symbol can be sent from the reader to the terminal at block 410 (corresponding to the reader informing the terminal that something has gone wrong).

Only in the case when a single card is present, the reader will implement the application selection, and an appropriate application on the card is selected at block 412. Data is then read from the card, as at block 414. Such data can include profile information such as a ticketing profile, as well as a balance. When multiple cards are present, as in the NO branch, the reader will initiate a removal sequence, as at 408.

In step 416, the appropriate application is initiated. In step 418, the reader can read all the data from the card or other device, but may retrieve only the PAN from the response message, saving other data for later use. In the example shown in FIG. 4, the application data is compliant with the ONESMART PAYPASS® application, also known as PAYPASS M/CHIP®, promulgated by MasterCard International Incorporated. However, this is purely for purposes of example, and other appropriate specifications can be compiled with or employed. In parallel, at step 420, the reader can send the ticketing profile and balance as part of an activate entry response, as a result of two successful GetData commands. At step 422, the reader can receive a debit entry command and parsed data from the terminal as a preparation for a first Generate AC command to be conducted in the future. In parallel, in step 418, appropriate data is read from the card or other device by a Read Record command. Typically, in an optimized flow, the terminal will send the Debit Entry command before the reader reaches the point where it is ready to send the first Generate AC command. In block 424, the reader requests a transaction certificate (TC). In block 426, the reader sends the Debit Entry response to the terminal, containing the clearing record.

In block 428, a determination is made whether the card or other device has generated an application authentication cryptogram (AAC) or an authorization request cryptogram (ARQC). If such is the case, the reader declines the transaction without further processing as shown at block 410. Conversely, following the "no" branch at block 428, a determination is made whether combined DDA/AC generation was requested. Note that "DDA" stands for Dynamic Data Authentication, "AC" stands for Application Cryptogram, and the two are combined into "CDA" which stands for "Combined DDA/AC." If such generation was requested, at block 434, the reader retrieves the public key of the electronic payment device (such as, e.g., an Integrated Circuit Card (ICC) and verifies the signed dynamic application data (SDAD). At block 436, if the SDAD is correct, processing flows to block 438, while if the SDAD is incorrect, the reader declines the transaction as per block 410. In the "no" branch of block 430, static data authentication is performed at block 432 by the reader. The reader will set an appropriate bit in the TVR if the static data authentication fails. Note that "TVR" stands for Terminal Verification Results, a set of flags generated by the terminal that contains the results of the terminal's risk management decisions. It passes this to the card in "genAC." In blocks 438 and 440 the reader performs appropriate processing restrictions and terminal risk management. Again, appropriate bits in the TVR are set if one or more tests fail.

In block 442, the reader performs terminal action analysis. If the result is a TC request, as determined in block 444, the reader accepts the transaction; conversely, at the "no" branch of block 444, the transaction is declined as at block 410. In block 448, the reader sends the Debit Entry response to the terminal, containing the clearing record. The reader can send the Debit Entry response to the terminal containing the output from the first Generate AC response; suitable exception handling may be implemented by the reader in the case that the card or the other device does not respond to the Generate AC command. It will be appreciated that blocks 406, 418, 424, 428, 430-436, 438, 440, 442 and 446 can correspond to actions taken at an application level. Further, blocks 402, 410, 420, 422, and 448 can correspond to actions taken at a transport or e-merchandise level. The steps in FIG. 4 may be carried out in connection with terminal-reader interactions.

In general terms, in a normal EMV transaction flow, the right application is selected on the card or other device, data is read from the card or other device, terminal risk analysis and terminal action analysis are performed, the card is asked for a cryptogram of a type determined by the above analysis, and the card then does its risk analysis and responds to the terminal in an appropriate fashion. In the modified transaction flow set forth herein, when reading data from the card, ticketing or e-merchandise related data may optionally also be read and supplied to the ticketing or other e-merchandise terminal. Such data can be read by the normal EMV Read Record command, or by one or more GetData commands. When the card or other device is asked for a cryptogram, the card is told certain data items in a format requested by the card. The card request will typically include the ticket tag so that if a ticket is present, it is passed to the card when the cryptogram is requested (if ticketing is not understood, zeroes are simply passed to the card). The card logs the data in an extension to the normal transaction log. Optionally, it is also possible to write to a data store before or after the cryptogram request. This can be done with a PutData command, but in a variation to normal EMV, it can be done without any securing acting just as an open data store. Both options have been discussed above. Optionally, if one is jut logging entry into an area, the PutData need not be followed by a cryptogram request.

When the appropriate application is selected, the terminal can perform a GetProcessingOptions command. This command tells the terminal some basic facts about the card and transaction and also provides a parameter which is used to determine which Terminal File Records need to be read (in one or more embodiments, such parameter can be, for example, the Application File Locator or "AFL" parameter from the EMV specification). This latter record is a list of the data items to be read for a given transaction. Records can then be read using the Read Record command. Other data items such as the offline balance can be read with a GetData command.

Normally, PutData commands are done as part of "scripting," i.e., a sequence of cryptographically secured commands with MACs. In one or more card applications configured in accordance with techniques of the invention, both this type of PutData and a type of PutData that does not have a MAC can be supported. A number of data stores used for storing tickets can be defined. Half of these can be open and half can be secure (i.e. freely read, scripting for write). Again, these details are exemplary in nature and other variations are possible.

One of the data items read in the Terminal File Records is called (CDOL1. This data item tells the terminal the list of tags to be supplied in the cryptogram request, items such as amount, currency, and the like. To this can be added an extra tag for tickets or other e-merchandise, so that the terminal provides a ticket or other e-merchandise in the cryptogram request. The basic rule under the EMV standard is that if a tag is not understood, zeroes are filled in. This feature can be employed to ensure that a non-ticketing or non-e-merchandise terminal will not reject a card or other device employing inventive techniques.

The cryptogram can be requested by means of a "Generate AC" command. This cryptogram is typically only understood by the issuer, but the card or other device may digitally sign it using RSA. RSA is a well-known algorithm for public key encryption that can also be used for digital signatures. The terminal can check this as it obtains the keys that it needs from the terminal file records.

Figure 5:
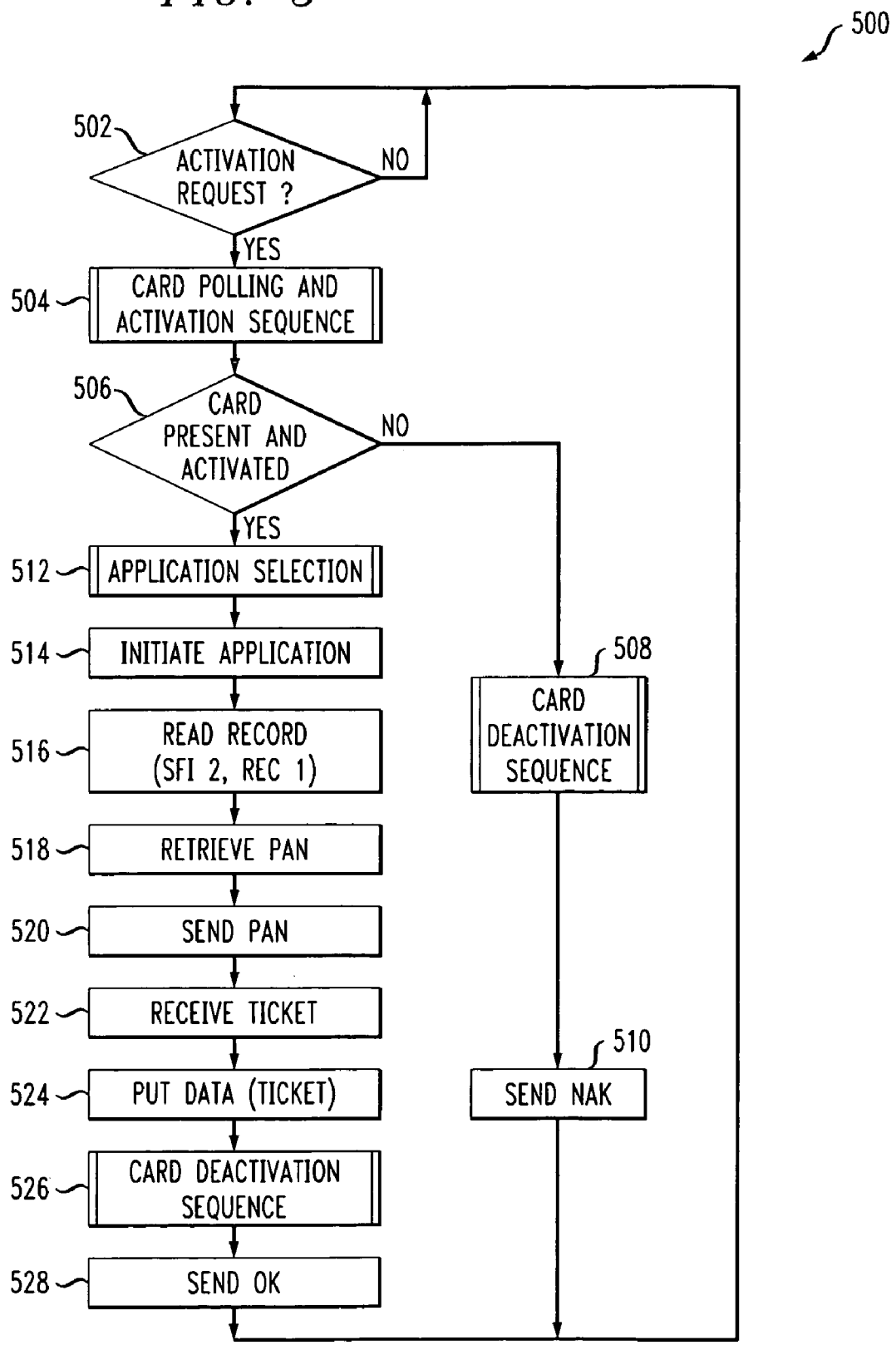
FIG. 5 is a specific detailed flowchart showing exemplary method steps in one specific exemplary transaction flow for storing an electronic ticket at a reader.

Attention should now be given to FIG. 5, which depicts an exemplary reader transaction flow for the storage of a ticket or other e-merchandise. At block 502, the reader receives a GET CARD ID command and begins polling for cards in the field (in the case of contactless cards), as at block 504. At block 506, if a single card is present in the field, the reader moves the application selection at block 512. If multiple cards are present, the reader initiates the removal sequence as at block 508 and block 510. At block 516, the reader reads the first record from the Terminal File Records. This record contains the PAN, the application expiry date, and optionally the PAN sequence number. While the arrangement described may offer speed advantages, the PAN can, if desired, be located in any other record. The variables mentioned throughout are familiar to the skilled artisan from the EMV specification. At block 518, the reader parses record one, and retrieves the PAN, application expiry date, and PAN sequence number. If the PAN sequence number is not included in the record, the reader uses the value "00".

At block 520, the reader sends the PAN, PAN sequence number and the application expiry data as the GetCard ID response. At block 522, the reader receives a store ticket command and parses the data as a preparation for the PutData command. The PutData command, for the ticket or other e-merchandise, is shown in block 524. The reader sends the ticket or other e-merchandise to the card with the PutData command (without using secure messaging). At block 526, the card deactivation sequence occurs, while at block 528 the reader informs the terminal that everything proceeded appropriately. Block 510 "Send NAK" corresponds to the reader informing the terminal that something has gone wrong.

It will be appreciated that blocks 506, 516, 518 and 524 can correspond to activity at the application level. Blocks 504 and 526 can correspond to activity at the transport level. Blocks 502, 510, 520, 522, and 528 can correspond to terminal-reader interactions.

Figure 6:
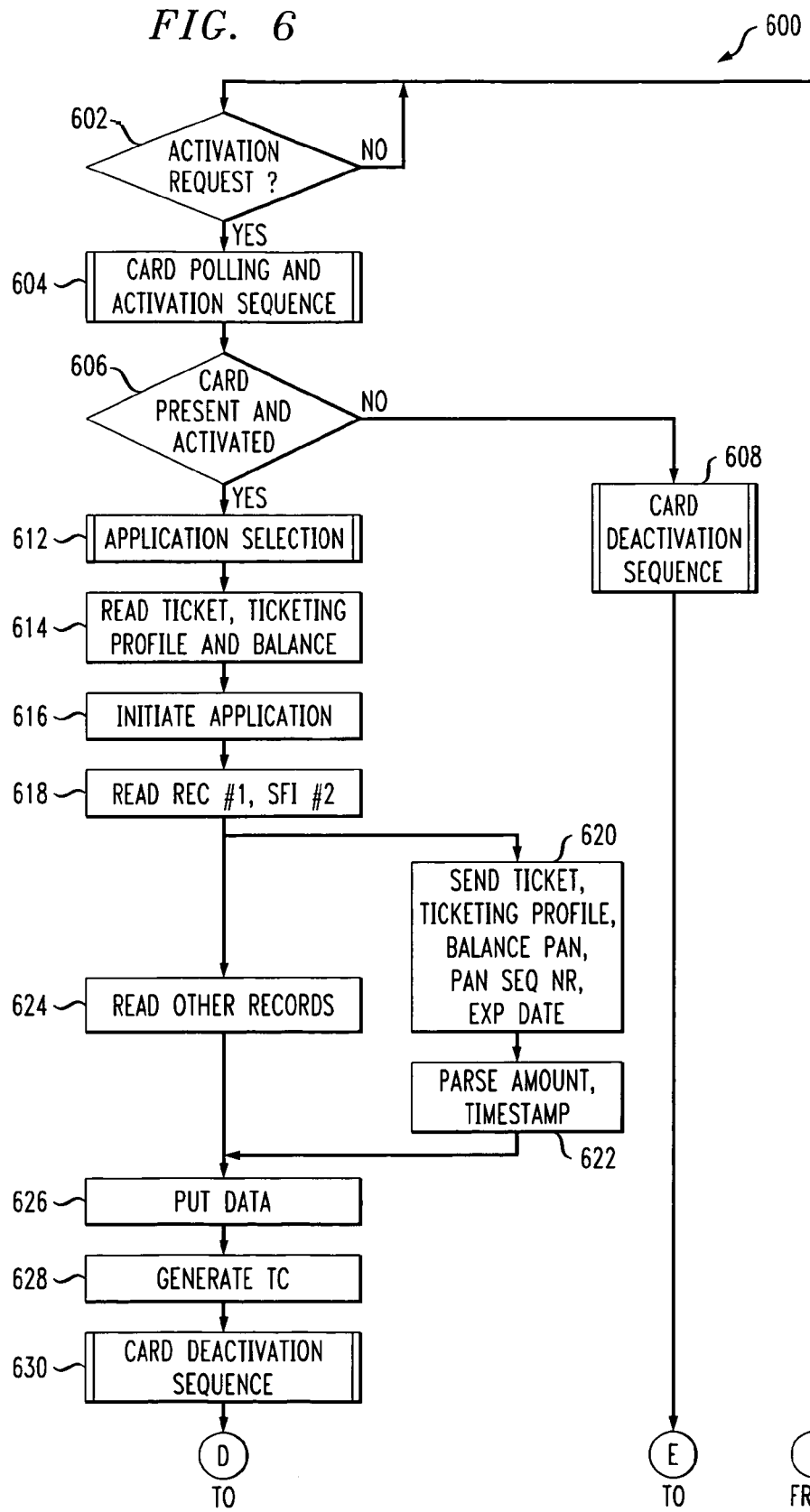
FIG. 6 shows specific exemplary method steps for the transaction flow at the exit to a controlled access system for payment at the exit.
Figure 6:
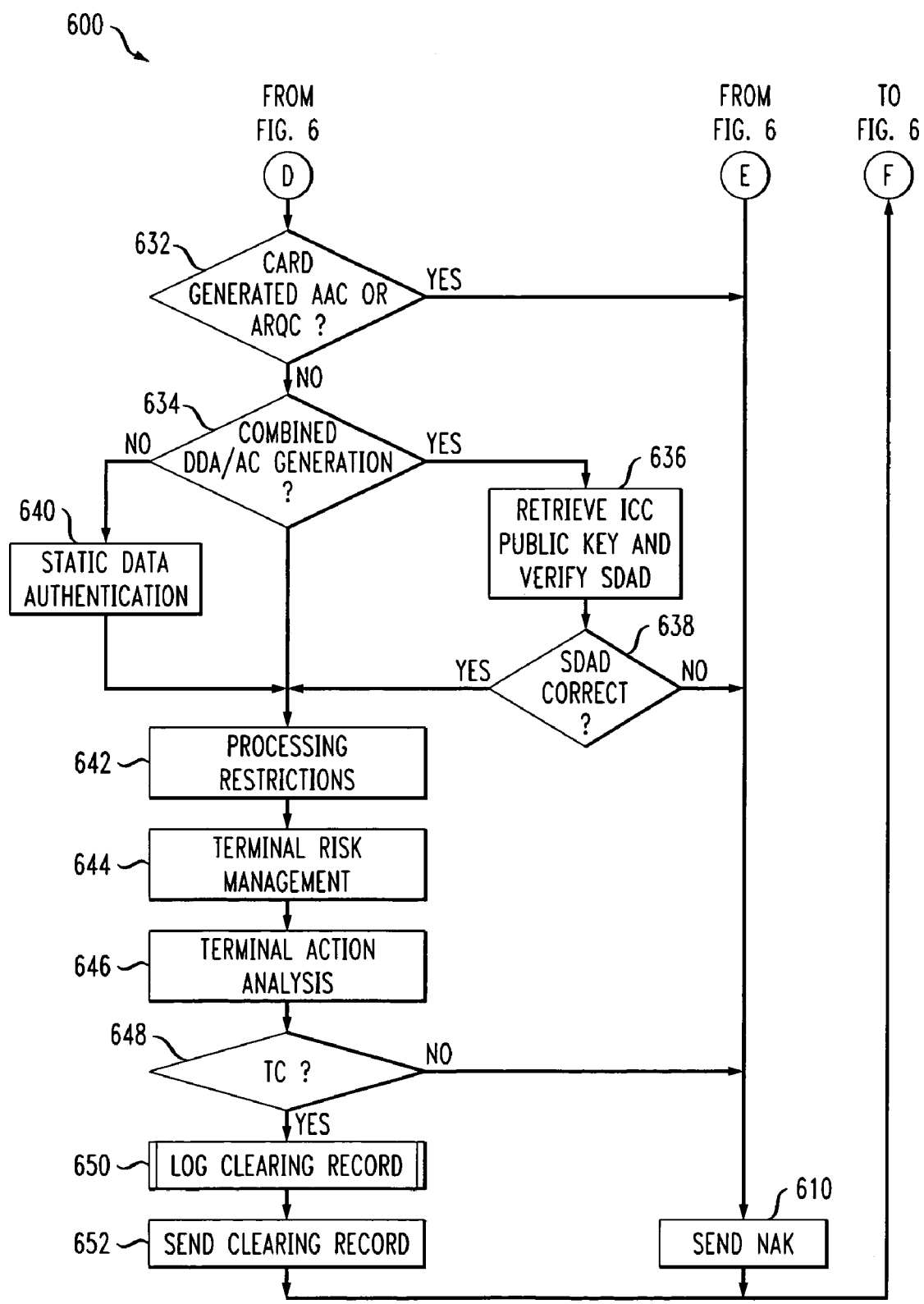

FIG. 6 shows a flowchart 600 of exemplary method steps in a transaction flow at the exit from a controlled system, such as a transportation system, for payment at the exit. At block 602, the reader receives the ACTIVATE EXIT command and begins polling for cards in the field, as at block 604. If no ACTIVATE EXIT command has been received, monitoring continues, as indicated at the "no" branch of block 602. The card polling and activation sequence is depicted at block 604. At block 606, a determination is made whether a single card is present in the field; if so, the reader moves the application selection as at block 612. Conversely, if multiple cards are present, the reader initiates the removal sequence, as at block 608, and the "Send NAK" block 610 is performed; the reader sends a debit response to the terminal, containing the status bytes from the first generate AC response as described further herein. After application selection at block 612, a ticket, ticketing profile and balance can be read at block 614, and the appropriate application is initiated at block 616. In block 618, the reader reads record one of SFI 2 to retrieve the PAN, PAN sequence number and application expiry date. At block 624, the reader reads other records to retrieve all required application data. In parallel, as shown at block 620, the reader sends the ticket, ticketing profile, balance, PAN, PAN sequence number and application expiry data as part of the ACTIVATE EXIT response. Meanwhile, the reader is reading the other card data, as at block 624 via Read Record commands.

At block 622, the reader receives the Debit Exit command and parses the data as a preparation for a future first Generate AC command. Again, in parallel, as at block 624 the reader keeps reading card data via read record commands. Typically, the terminal has sent the Debit Exit command before the reader is to send the first Generate AC command. The data parsed in block 622 can include an amount and a transaction date and/or time stamp. In block 626, the reader sends the PutData command to remove the ticket from the card, while in block 628, the reader requests a transaction certificate. The card deactivation sequence occurs in block 630. In block 632, it is determined whether the card generated an AAC or ARQC; if such is the case, as at the "yes" branch, the reader declines the transaction without further processing. If such is not the case, as at the "no" branch, a determination is made in block 634 whether combined DDA/AC generation was requested. If this is the case, the reader retrieves the ICC public key and verifies the signed dynamic application data at block 636. If the signed dynamic application data is incorrect as determined at block 638, the transaction is declined, while if the SDAD is correct, processing continues at block 642. If the decision in block 634 is negative, static data authentication is performed by the reader at block 640. The reader will set the appropriate bit in the TVR if the static data authentication fails. In blocks 642 and 644 the reader performs processing restrictions and terminal risk management, setting the appropriate bits in the TVR if one or more tests fail. The reader performs terminal action analysis in block 646. If the result is a TC request, as determined in block 648, then the reader accepts the transaction, as per the "yes" branch. In the case of a "no" answer, the transaction is declined. In block 650, for the clearing record, the reader should use the TVR as sent to the card, not the TVR used to collect the terminal risk management results. In block 652, the reader sends the debit exit response to the terminal, containing the clearing record.

It will be appreciated that the method depicted in FIG. 6 is a modification of a standard EMV procedure, adding, for example, steps 620 and 622. It will be further appreciated that blocks 606, 614, 618, 624, 626, 628, 632, 634-638, 640, 642, 644, 646 and 650 can correspond to actions at the application level. Further, blocks 604, 608 and 630 can correspond to actions at the transport level. Finally, blocks 602, 610, 620, 622, and 652 can correspond to terminal-reader interactions.

FIG. 7 shows how the e-merchandise is written to the payment device (referred to as a "Card") as part of a payment transaction. With regard to FIGS. 7 and 8, the skilled artisan will appreciate from the context the significance of the variables and will also appreciate that different variable names could be chosen. The Terminal, Reader and Card go through the following steps. In step 701, the Terminal generates a random number UN*. The Terminal calculates a challenge H* from the random number UN* using a one-way-function (OWF). At this stage, only the Terminal knows UN* and it is difficult to calculate UN* if H* is known. At 702, the Terminal sends an ACTIVATE command to the Reader to initiate the application. The Terminal includes the tags of the data elements that the reader should return in the ACTIVATE response message. This includes, e.g., the RND tag, ATC tag, Card ID tag and Customer Profile tag. The Terminal also includes H* indicating to the Reader that the interaction with the Card must be completed with the COMMIT command.

In step 703, the Reader starts polling for a Card. If a Card is found, the Reader activate the Card. In step 704, the Reader selects the appropriate application and initiates the application. In step 705, the Reader sends H* to the Card and receives RND and ATC. The card stores RND and H* in volatile memory for later use during the DEBIT and COMMIT command. The presence of H* indicates to the Card that non-volatile memory must be updated with the COMMIT command. The Reader retrieves the Customer Profile and Card ID from the Card in step 706.

In step 707, the Reader sends the data objects requested in step 702 to the Terminal in the ACTIVATE response message. This includes the RND, ATC, Card ID and Customer Profile. The Terminal determines the Amount based on the Customer Profile, at step 708; and calculates a MAC over the data of the Merchandise, RND, ATC and Card ID, at step 709. This way the Merchandise is linked to the Card ID and therefore it can not be used in another (genuine) Card. As it also includes the RND and ATC, it cannot be replayed to the same Card either. The Terminal stores the Merchandise in the MERCHANDISE envelope and fills the RND and ATC with hexadecimal 'F's. In step 710, the Terminal generates the Receipt.

At step 711, the Terminal sends the MERCHANDISE envelope together with the payment related data and the Receipt to the Reader as part of the DEBITWRITE command. At step 712, the Reader sends the MERCHANDISE envelope together with the payment related data and the Receipt to the Card as part of the DEBIT command. At step 713, the Card performs its card risk management and generates a Proof of Payment. The Card keeps any updates, including the Merchandise and Receipt, in volatile memory until UN* is presented as part of the COMMIT command. At step 714, the Reader sends UN* to the Card as part of the COMMIT command. Upon receipt of the COMMIT command, in block 715, the Card verifies if H* received as part of the GET CHALLENGE* is the same as OWF (UN*). If this is the case, then the Card updates its non-volatile memory. It stores the Merchandise together with RND and ATC in the Merchandise container and stores the Receipt in the Receipt container. The Card also updates the payment related parameters in non-volatile memory.

In block 716, the Reader authenticates the Card. The card authentication assures the Reader that the Card linked to the Card ID is a genuine Card. The Reader passes the Proof of Payment to the Terminal in block 717.

Figure 8:
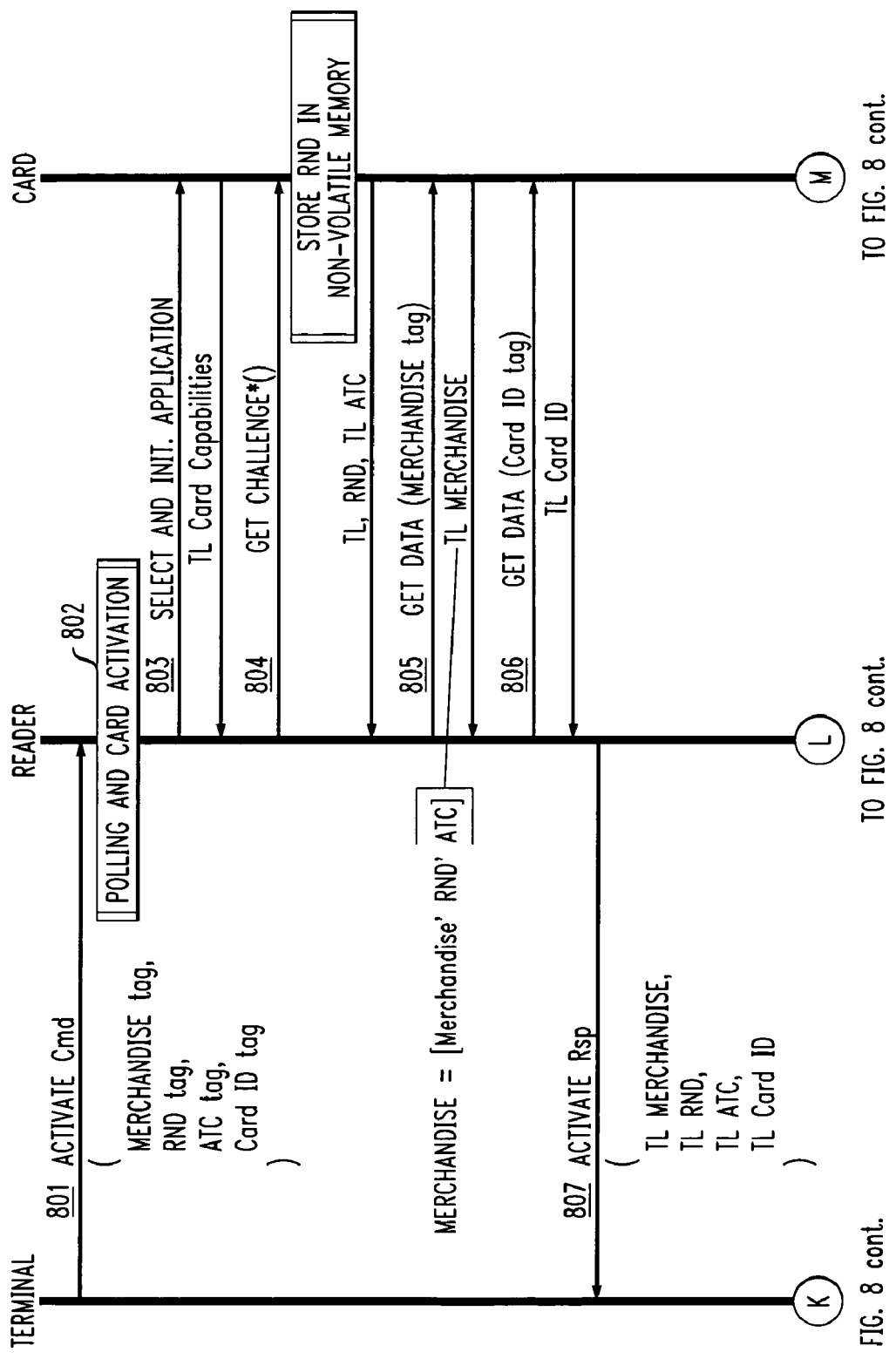
FIG. 8 exemplary data flows for updating e-merchandise, including exemplary security features.

FIG. 8 shows how the e-merchandise is read, checked for integrity and authenticity and then replaced by an update of the Merchandise. If the original Merchandise is a multiple-ticket package, such as a London Underground Carnet, the updated Merchandise will contain one Ticket less. If the original Merchandise is a single Ticket, the update invalidates the Ticket. The Terminal goes through the following steps. At step 801, the Terminal sends the ACTIVATE command to the Reader to initiate the application. The Terminal includes the tags of the data elements that the Reader must return in the ACTIVATE response message. The Terminal does not send H* to the Reader. This indicates to the Reader that the transaction does not have to be completed with the COMMIT command.

At block 802, the Reader starts polling for a Card. If a Card is found, the Reader activates the Card. In step 803, the Reader selects the appropriate application and initiates the application. In step 804, the Reader sends the GET CHALLENGE* command and receives RND and ATC. The Card stores RND in volatile memory for later use during the DEBIT command. The Card does not receive H* from the Reader. This indicates to the Card that no COMMIT command will be sent and that non-volatile memory must be updated with the DEBIT command.

In step 805, the Reader retrieves the Merchandise envelope currently stored in the Card. The MERCHANDISE envelope contains Merchandise', RND' and ATC'. In step 806, the Reader retrieves the Card ID from the Card. In step 807, the Reader sends the Card ID, RND, ATC and the MERCHANDISE envelope to the Terminal in the ACTIVATE Rsp message. In block 808, the Terminal checks whether Merchandise' was calculated over the RND' and ATC' for the particular Card ID. If so, in block 809, the Terminal calculates the new Merchandise over the same Card ID but uses the new RND and ATC. The Terminal stores the Merchandise in the MERCHANDISE envelope and fills the RND and ATC with hexadecimal 'F's. In block 810, the Terminal generates a Receipt.

In step 811, the Terminal sends the new MERCHANDISE envelope together with the Receipt to the Reader as part of the DEBITWRITE command. The DEBITWRITE command can be for a zero Amount so that there is no financial impact on the Card. In step 812, the Reader sends the new MERCHANDISE envelope together with the Receipt to the Card as part of the DEBIT command. In block 813, the Card stores the Merchandise together with RND and ATC in the Merchandise container and stores the Receipt in the Receipt container.

In steps 814, 815 and 816, the Reader authenticates the Card (the card authentication assures the Reader that the Card linked to the Card ID is a genuine card) and the Reader passes the Proof of Payment (for a zero Amount) to the Terminal.

It will be appreciated that in general, prior art systems rely on merchandise to be delivered after payment. One or more inventive techniques enable a trust model of data storage that allows merchandise to be delivered before payment occurs. Within this data storage concept, the availability of the merchandise is free but the usage ("consumption") is restricted. Unlike physical goods, it doesn't cost anything to "manufacture" bits & bytes. One can take the risk of providing e-merchandise as long as one is sure that payment is received before the e-goods are consumed. Therefore, the trust model of data storage is believed to be particularly pertinent to e-merchandise. The merchant can use this trust model if, e.g., he can rely on additional card functionality (such as trust in the issuer); the card application should provide protection against cloning as well as against re-use of goods. Thus, the integration of payment with on-card data storage (e.g. ticketing or other e-merchandise) enables the new trust model, and one or more inventive techniques can implement on-card data storage using a fast and simple transaction flow.

To review, in the traditional trust model for card payment, the merchant trusts the acquirer for payment. The merchant provides the client with goods after a simple "OK" from the acquirer. The merchant knows the acquirer will honor this "OK" and pay the merchant as part of the settlement process. In the extended model, the merchant also relies on additional functionality in terminal and card to control distribution and usage of e-merchandise. Hence, the merchant needs to trust both the acquirer and the issuer for management of goods.

Figure 9:
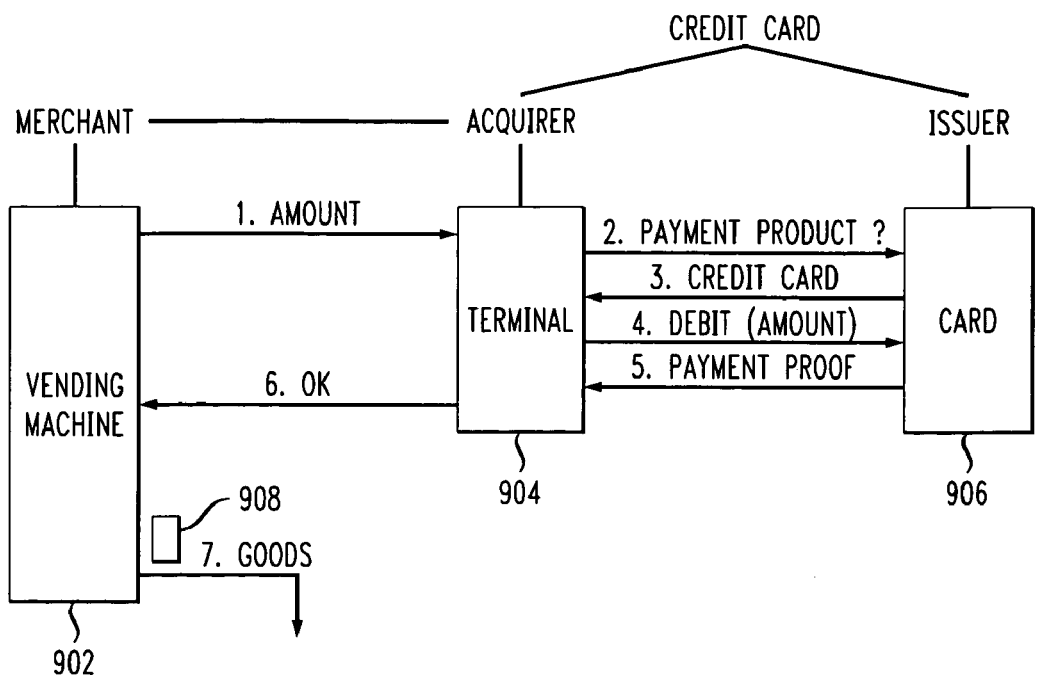
FIG. 9 shows a traditional trust model.

FIG. 9 illustrates the traditional trust model. In this model, there is a clean separation of responsibilities:
The merchant is responsible for the vending machine 902.
The acquirer is responsible for the (payment) terminal 904.

Merchant and acquirer have a (commercial) relation based on trust: if the acquirer (via the terminal) confirms to the merchant (i.e. to the vending machine) that a transaction is successful, then goods 908 are delivered. The acquirer shields the complexity of the card interaction from the merchant; there is no direct relation between merchant and issuer of the card 906.

Figure 10:
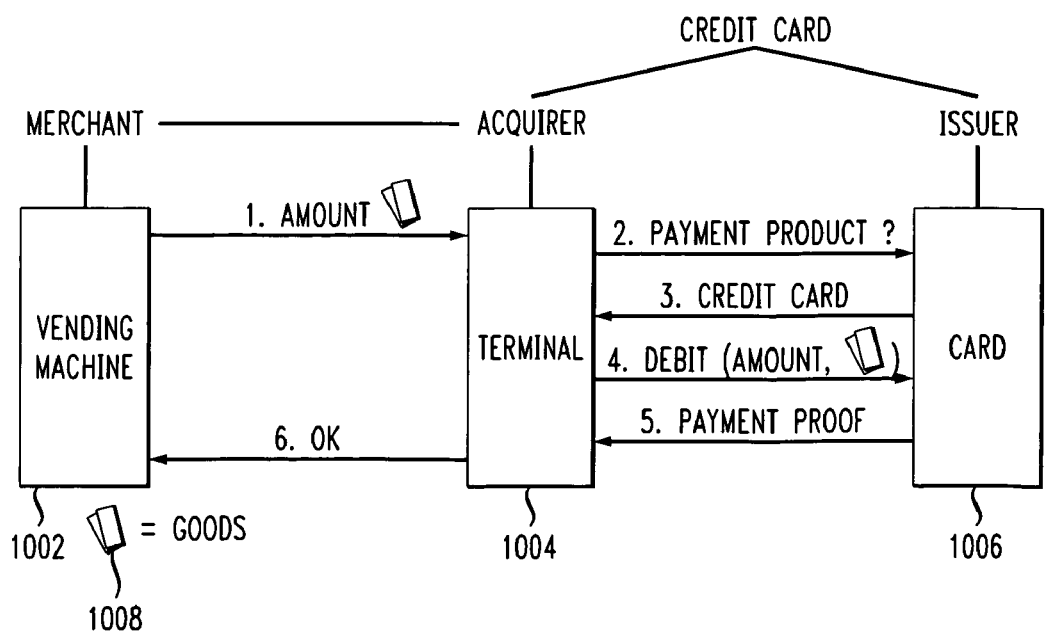
FIG. 10 shows purchase within an exemplary inventive extended trust model.
Figure 11:
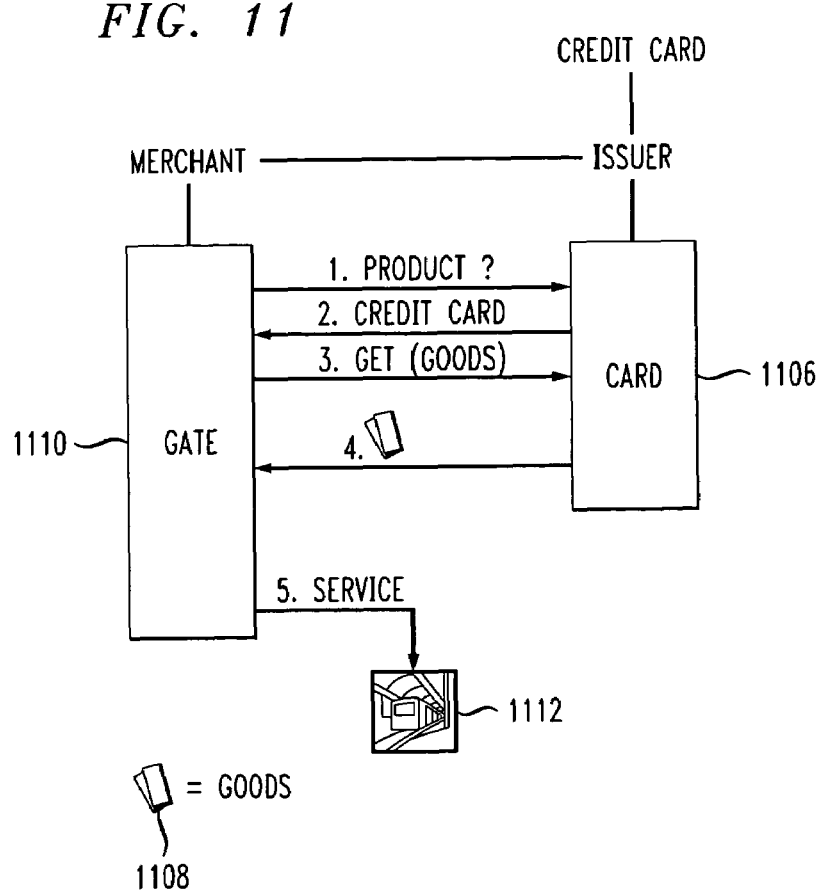
FIG. 11 shows usage within the exemplary inventive extended trust model.

The extended trust model applies when the goods are in electronic format. In this case, the e-merchandise gives access to a service (transport, music, and the like), further referred to as "usage". A typical case is a client buying a ticket (e-merchandise) at a vending machine and then putting the ticket into a turnstile to open the gate (usage). If it concerns an e-ticket, a data carrier is needed to hold the data. One choice for such a data carrier is the payment card used for buying the ticket. As the card is the carrier of the ticket, the card will be involved at time of usage. This extra involvement of the card requires an extension of the trust model to include both acquirer and issuer. FIG. 10 illustrates the proposed trust model for buying an e-ticket at the vending machine; FIG. 11 illustrates the proposed trust model at the gate.

Unlike FIG. 9, the vending machine 1002 in FIG. 10 provides the goods (e-merchandise) 1008 to the terminal 1004 prior to confirmation of payment. This requires an additional level of trust from the merchant. The merchant relies on the acquirer to implement a transaction flow that prevents access to goods without payment. This additional level of trust from the merchant is acceptable as it concerns e-merchandise (binary data). The e-merchandise has no value other than the service it gives access to. In case of non-payment, the merchant bears no financial loss as long as a client cannot use the goods. The issuer of the card 1006 is depicted as in FIG. 9. p As seen in FIG. 11, when the client exchanges the e-goods 1108 for services such as rail transport 1112, the gate 1110 "talks" directly to the card 1106. As there is no payment to settle, acquirer and terminal are out of the loop. The merchant relies on additional card functionality as protection against counterfeit goods. Hence, there must be a relation of trust between the merchant and the issuer.

Counterfeit goods include:
1. data created by a fraudster that is similar to or the same as genuine goods
2. clones of genuine goods
3. replays of genuine goods.

Merchants already have ways of detecting fake goods in the gate. They rely on the card functionality to protect against cloning and replay. Therefore, within the extended trust model, the merchant relies on the issuer to control usage of e-merchandise and to provide countermeasures against cloning and replay.

In summary, in order for the extended trust model to work, the data storage should protect against:
1. usage of unpaid goods (extended responsibility of acquirer)
2. cloning of goods (extended responsibility of issuer)
3. re-use of goods (extended responsibility of issuer)

Protection against fake goods remains the responsibility of the merchant.

The relevance of having generic data storage functionality on card and terminal will now be described within the context of the extended trust model. In one or more inventive embodiments, protection mechanisms as just described can be implemented
via a generic (payment) terminal
via a generic (payment) card
without requiring merchant controlled keys in either card or terminal.

The usage of generic devices allows:
Issuers to provide payment cards that
Can be used for ticketing, loyalty, and the like
Without a pre-arrangement between the issuer and the merchant
Without knowledge of the specific requirements of the merchant.
Acquirers to provide terminals that
Can be used for ticketing, loyalty, and the like
Without knowledge of the specific requirements of the merchant.
Merchants to use generic payment cards and terminals
As vehicle for their specific data storage application
Without knowledge of the payment application.

More detail will now be given on the functionality provided by the generic data storage. In order to have the full benefit, the data storage function in the card (and terminal) should allow for all merchant specific requirements. In one or more embodiments, the envisaged functionality covers may be as set forth in the following table:

| Functionality | Meaning |
|---|---|
| 1. Retrieval of different client profiles | Client profiles contain information about the client from the perspective of the merchant. The merchant can use the client profile for |
| | giving access to particular services determining the transaction amount As the client profile is merchant specific, a single client may have different profiles for different merchants in the same card. |
| 2. Management of single tickets, booklets ("carnets") as well as subscriptions. | A single ticket provides a one-time access to a service. After usage, the merchant invalidates the ticket so that a client cannot use it again. A booklet is a collection of single tickets. Hence, a booklet is a particular type of goods that is used gradually (e.g. one ticket at the time). A subscription gives access to a service over a longer time. The validity of the subscription is defined by the merchant (a day, a week, a month, and so on). |
| 3. Management of receipts. | A receipt is proof given to the client when goods are exchange for services. It allows a customer to proof that he/she is entitled to use the service (e.g. being present on a train). Note: for subscriptions, receipts may not be necessary. |

Figure 12:
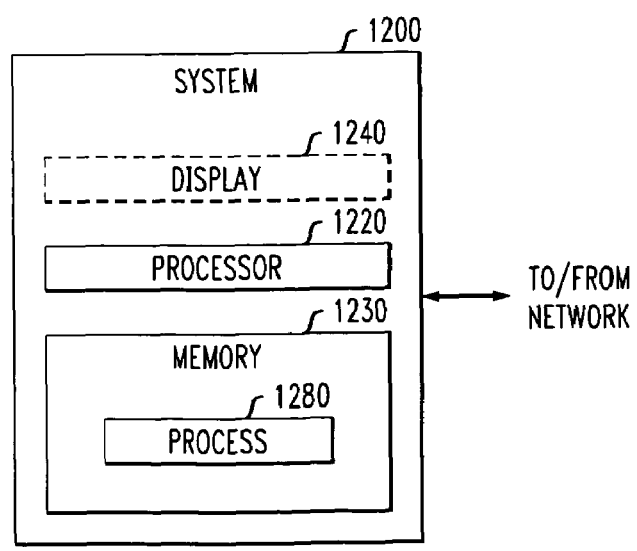
FIG. 12 is a block diagram of an exemplary computer system useful in one or more embodiments of the present invention.

The invention can employ hardware and/or software aspects. Software includes but is not limited to firmware, resident software, microcode, etc Software might be employed, for example, in connection with a terminal 122, 124, 126, 134, 206, 208. Firmware might be employed, for example, in connection with payment devices such as cards 102, 112, 1302. FIG. 12 is a block diagram of a system 1200 that can implement part or all of one or more aspects or processes of the present invention. As shown in FIG. 12, memory 1230 configures the processor 1220 (which could correspond, e.g., to processor portions 106, 116) to implement one or more aspects of the methods, steps, and functions disclosed herein (collectively, shown as process 1280 in FIG. 12). The memory 1230 could be distributed or local and the processor 1220 could be distributed or singular. The memory 1230 could be implemented as an electrical, magnetic or optical memory, or any combination of these or other types of storage devices (including memory portions as described above with respect to cards 102, 112) It should be noted that if distributed processors are employed, each distributed processor that makes up processor 1220 generally contains its own addressable memory space. It should also be noted that some or all of computer system 1200 can be incorporated into an application-specific or general-use integrated circuit. For example, one or more method steps could be implemented in hardware in an ASIC rather than using firmware. Display 1240 is representative of a variety of possible input/output devices.

System and Article of Manufacture Details

As is shown in the art, part or all of one or more aspects of the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. Such methods, steps, and functions can be carried out, e.g., by processing capability on elements 102, 112, 142, 122, 124, 126, 134, 140, 206, 208, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention, such as, for example, the aforementioned terminals 122, 124, 126, 134, 206, 208 or payment devices such as cards 102, 112, 1302 can make use of computer technology with appropriate instructions to implement method steps described herein. By way of further example, a terminal apparatus 122, 124, 126, 134, 206, 208 could include a communications module, an antenna coupled to the communications module, a memory, and at least one processor coupled to the memory and the communications module and operative to interrogate a contactless payment device (in lieu of the antenna and communications module, appropriate contacts and other elements could be provided to interrogate a contact payment device such as a contact card).

Accordingly, it will be appreciated that one or more embodiments of the present invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method for integrated payment and electronic merchandise transfer via: (i) a payment infrastructure, configured in accordance with a payment system standard, in association with (ii) an electronic merchandise infrastructure, comprising the steps of:

facilitating interrogation of an electronic payment device by a first terminal to obtain an account number associated with said electronic payment device, said electronic payment device being configured according to the payment system standard, said first terminal having a first terminal payment module configured according to the payment system standard and a first terminal electronic merchandise module configured according to the electronic merchandise infrastructure and coupled to said first terminal payment module to permit transfer of non-payment e-merchandise related information from said first terminal electronic merchandise module to said first terminal payment module, said interrogation of said electronic payment device being performed by said first terminal payment module;

facilitating generation of said non-payment e-merchandise related information by said first terminal electronic merchandise module; and facilitating transfer of said non-payment e-merchandise related information from said first terminal electronic merchandise module to said electronic payment device via said first terminal payment module, within a transaction between said electronic payment device and said first terminal payment module that is conducted in accordance with said account number and said payment system standard, said non-payment e-merchandise related information being stored on said electronic payment device in accordance with said payment system standard.

2. The method of claim 1, wherein in said step of facilitating interrogation:

profile data pertaining to a holder of said electronic payment device is obtained; and said e-merchandise related information is generated by said first terminal electronic merchandise module based on said profile data.

3. The method of claim 2, wherein said profile data includes information identifying said holder of said electronic payment device as a member of a class having at least one of a plurality of entitlement categories associated therewith, said entitlement categories relating to said e-merchandise.

4. The method of claim 3, wherein said entitlement categories comprise transportation fare categories and said e-merchandise related information comprises transportation ticket information.

5. The method of claim 1, wherein said steps are executed in connection with entrance of a holder to a controlled access system and said e-merchandise related information comprises initial entry point information.

6. The method of claim 5, wherein said first terminal is an entrance terminal, further comprising the additional steps of:

facilitating interrogation of said electronic payment device by an exit terminal upon exit of said holder from said system, to obtain said initial entry point information, said exit terminal having an exit terminal payment module configured according to the payment system standard and an exit terminal electronic merchandise module configured according to the electronic merchandise infrastructure and coupled to said exit terminal payment module to permit transfer of non-payment e-merchandise related information from said exit terminal electronic merchandise module to said exit terminal payment module; and facilitating at least one of:
providing a ticket to the holder, and
charging a fee to the holder, via said exit terminal payment module, based upon said initial entry point information and a location of said exit terminal.

7. The method of claim 6, wherein said entrance terminal and said exit terminal are the same.

8. The method of claim 6, wherein said entrance terminal and said exit terminal are distinct.

9. The method of claim 6, wherein in said step of facilitating interrogation, profile data pertaining to a holder of said electronic payment device is obtained, said profile data including information identifying said holder of said electronic payment device as a member of a class having at least one of a plurality of entitlement categories associated therewith, said entitlement categories relating to said e-merchandise.

10. The method of claim 9, wherein said entitlement categories comprise transportation fare categories and said e-merchandise related information comprises transportation ticket information.

11. The method of claim 1, wherein said electronic payment device is a contactless radio frequency (RF) proximity card.

12. The method of claim 1, wherein said electronic payment device is a contacted card.

13. The method of claim 1, wherein said electronic payment device is a dual-interface card having both contactless radio frequency (RF) and contacted interfaces.

14. The method of claim 1, wherein said electronic payment device has a non-card form factor.

15. The method of claim 1, further comprising the additional steps of:

facilitating interrogation of said electronic payment device by said first terminal to obtain a transaction counter and an account number;

facilitating calculation of an authentication code including said transaction counter and said account number;

facilitating determining whether said transaction counter and said account number obtained from said electronic payment device match said transaction counter and said account number included in said authentication code; and facilitating refusal of storage of said authentication code by said electronic payment device, responsive to said determining revealing that said transaction counter and said account number obtained from said electronic payment device do not match said transaction counter and said account number included in said authentication code, whereby a likelihood of replay fraud is reduced;

wherein said steps of facilitating interrogation, calculation, determining, and refusal are carried out substantially without key sharing with said electronic payment device.

16. The method of claim 15, further comprising the additional step of:

facilitating skimming detection, based on said account number, said authentication code, and a unique data authentication signature associated with said transaction, said authentication code including said account number, said account number being signed by said unique data authentication signature.

17. The method of claim 1, further comprising the additional steps of:

facilitating interrogation of said electronic payment device by said first terminal to obtain a transaction counter, an electronic payment device identifier, and an electronic payment device-generated random number.

facilitating calculation of an authentication code based on said e-merchandise related information, said transaction counter, said electronic payment device identifier, and said electronic payment device-generated random number;

facilitating detection of replay fraud via said transaction counter and said payment device-generated random number;

wherein said steps of facilitating interrogation, calculation, and detection are carried out substantially without key sharing with said electronic payment device.

18. The method of claim 17, further comprising the additional step of:

facilitating skimming detection, based on linkage of said e-merchandise related information to said electronic payment device identifier.

19. The method of claim 1, further comprising the additional step of facilitating payment for said e-merchandise, said payment occurring after said transfer of said e-merchandise related information to said electronic payment device.

20. The method of claim 19, further comprising the additional step of facilitating fraud detection substantially contemporaneously with an attempted usage of said e-merchandise related information.

21. The method of claim 19, further comprising the additional step of preventing usage of said e-merchandise related information prior to said payment.

22. A terminal for integrated payment and electronic merchandise transfer via: (i) a payment infrastructure, configured in accordance with a payment system standard, in association with (ii) an electronic merchandise infrastructure and in conjunction with an electronic payment device configured according to the payment system standard, said terminal comprising:

a payment module configured according to the payment system standard and configured to interrogate the electronic payment device to obtain an account number associated with said electronic payment device; and an electronic merchandise module configured according to the electronic merchandise infrastructure and coupled to said payment module to permit transfer of non-payment e-merchandise related information from said electronic merchandise module to said payment module, said electronic merchandise module being configured to facilitate processing of said non-payment e-merchandise related information;

wherein said payment module is further configured to facilitate transfer of said non-payment e-merchandise related information to the electronic payment device, in a transaction between the electronic payment device and said payment module that is conducted in accordance with said account number and said payment system standard, said non-payment related e-merchandise related information being stored on said electronic payment device in accordance with said payment system standard.

23. The terminal of claim 22, wherein:

said payment module is further configured to interrogate the electronic payment device to obtain profile data pertaining to a holder of said electronic payment device; and said first terminal electronic merchandise module is configured to process said e-merchandise related information based on said profile data.

24. The terminal of claim 22, wherein said processing of said e-merchandise related information comprises generating said e-merchandise related information.

25. The terminal of claim 22, wherein said processing of said e-merchandise related information comprises reading said e-merchandise related information.

26. The terminal of claim 22, wherein said processing of said e-merchandise related information comprises updating said e-merchandise related information.

27. A computer program product comprising a computer usable medium including computer usable program code for integrated payment and electronic merchandise transfer via: (i) a payment infrastructure, configured in accordance with a payment system standard, in association with (ii) an electronic merchandise infrastructure, said computer program product including:

computer usable program code for facilitating interrogation of an electronic payment device by a first terminal to obtain an account number associated with said electronic payment device, said electronic payment device being configured according to the payment system standard, said first terminal having a first terminal payment module configured according to the payment system standard and a first terminal electronic merchandise module configured according to the electronic merchandise infrastructure and coupled to said first terminal payment module to permit transfer of non-payment e-merchandise related information from said first terminal electronic merchandise module to said first terminal payment module, said interrogation of said electronic payment device being performed by said first terminal payment module;

computer usable program code for facilitating generation of non-payment e-merchandise related information by said first terminal electronic merchandise module; and computer usable program code for facilitating transfer of said non-payment e-merchandise related information from said first terminal electronic merchandise module to said electronic payment device via said first terminal payment module, within a transaction between said electronic payment device and said first terminal payment module that is conducted in accordance with said account number and said payment system standard, said non-payment e-merchandise related information being stored on said electronic payment device in accordance with said payment system standard.

28. The computer program product of claim 27, further comprising computer usable program code for obtaining profile data pertaining to a holder of said electronic payment device, wherein said e-merchandise related information is generated by said first terminal electronic merchandise module based on said profile data.

29. The computer program product of claim 28, wherein said profile data includes information identifying said holder of said electronic payment device as a member of a class having at least one of a plurality of entitlement categories associated therewith, said entitlement categories relating to said e-merchandise.

30. An electronic payment device for facilitating integrated payment and electronic merchandise transfer via: (i) a payment infrastructure, configured in accordance with a payment system standard in association with (ii) an electronic merchandise infrastructure, said electronic payment device being configured according to the payment system standard, said electronic payment device comprising:
a memory; and
at least one processor coupled to said memory, said processor being operative to:
facilitate interrogation of said electronic payment device by a first terminal to obtain an account number associated with said electronic payment device, said first terminal having a first terminal payment module configured according to the payment system standard and a first terminal electronic merchandise module configured according to the electronic merchandise infrastructure and coupled to said first terminal payment module to permit transfer of non-payment e-merchandise related information from said first terminal electronic merchandise module to said first terminal payment module, said interrogation of said electronic payment device being performed by said first terminal payment module;
facilitate generation of said non-payment e-merchandise related information by said first terminal electronic merchandise module; and
facilitate transfer of said non-payment e-merchandise related information from said first terminal electronic merchandise module to said electronic payment device via said first terminal payment module, within a transaction between said electronic payment device and said first terminal payment module that is conducted in accordance with said account number and said payment system standard, said non-payment e-merchandise related information being stored on said electronic payment device in accordance with said payment system standard.

31. The electronic payment device of claim 30, wherein said processor is further operative to facilitate said terminal obtaining profile data pertaining to a holder of said electronic payment device, wherein said e-merchandise related information is generated by said first terminal electronic merchandise module based on said profile data.

32. The electronic payment device of claim 31, wherein said profile data includes information identifying said holder of said electronic payment device as a member of a class having at least one of a plurality of entitlement categories associated therewith, said entitlement categories relating to said e-merchandise.

33. The electronic payment device of claim 30, wherein said processor is operative to perform said steps in connection with entrance of a holder to a controlled access system and said e-merchandise related information comprises initial entry point information.

34. The electronic payment device of claim 33, wherein said first terminal is an entrance terminal, wherein said processor is further operative to:
facilitate interrogation of said electronic payment device by an exit terminal upon exit of said holder from said system to said initial entry point information, said exit terminal having an exit terminal payment module configured according to the payment system standard and an exit terminal electronic merchandise module configured according to the electronic merchandise infrastructure and coupled to said exit terminal payment module to permit transfer of non-payment e-merchandise related information from said exit terminal electronic merchandise module to said exit terminal payment module; and
facilitate at least one of:
providing a ticket to the holder; and
charging a fee to the holder,
via said exit terminal payment module, based upon said initial entry point information and a location of said exit terminal.

35. A computer-implemented method for integrated payment and electronic merchandise transfer via a payment infrastructure, having a payment infrastructure standard, in association with an electronic merchandise infrastructure, comprising the steps of:
facilitating interrogation of an electronic device by a first terminal to obtain an account number associated with said electronic device, said electronic device being configured according to the payment infrastructure standard to support a transaction flow according to the payment infrastructure standard, said first terminal having a first terminal payment module configured according to the payment infrastructure standard and a first terminal electronic merchandise module configured according to the electronic merchandise infrastructure and coupled to said first terminal payment module to permit transfer of non-payment e-merchandise related information from said first terminal electronic merchandise module to said first terminal payment module, said interrogation of said electronic device being performed by said first terminal payment module;
facilitating generation of said non-payment e-merchandise related information by said first terminal electronic merchandise module; and
facilitating transfer of said non-payment e-merchandise related information from said first terminal electronic merchandise module to said electronic device via said first terminal payment module, within a transaction between said electronic device and said first terminal payment module that is conducted in accordance with said account number and the payment infrastructure standard, said non-payment e-merchandise related information being stored on said electronic device in accordance with said payment infrastructure standard.

36. A terminal for integrated payment and electronic merchandise transfer via a payment infrastructure, having a payment infrastructure standard, in association with an electronic merchandise infrastructure and in conjunction with an electronic device configured according to the payment infrastructure standard to support a transaction flow according to the payment infrastructure standard, said terminal comprising:
a payment module configured according to the payment infrastructure standard and configured to interrogate the electronic device to obtain an account number associated with said electronic device; and
an electronic merchandise module configured according to the electronic merchandise infrastructure and coupled to said payment module to permit transfer of non-payment e-merchandise related information from said electronic merchandise module to said payment module, said electronic merchandise module being configured to facilitate processing of e-merchandise related information;
wherein said payment module is further configured to facilitate transfer of said non-payment e-merchandise related information from said electronic merchandise module to the electronic device via said payment module, in a transaction conducted in according with said account device and the payment infrastructure standard, said non-payment e-merchandise related information being stored on the electronic device in accordance with said payment infrastructure standard.

37. A computer program product comprising a computer usable medium including computer usable program code for integrated payment and electronic merchandise transfer via a payment infrastructure, having a payment infrastructure standard, in association with an electronic merchandise infrastructure, said computer program product including:

computer usable program code for facilitating interrogation of an electronic device by a first terminal to obtain an accounter number associated with said electronic device, said electronic device being configured according to the payment infrastructure standard to support a transaction flow according to the payment infrastructure standard, said first terminal having a first terminal payment module configured according to the payment infrastructure standard and a first terminal electronic merchandise module configured according to the electronic merchandise infrastructure and coupled to said first terminal payment module to permit transfer of non-payment e-merchandise related information from said first terminal electronic merchandise module to said fist terminal payment module, said interrogation of said electronic device being performed by said first terminal payment module;

computer usable program code for facilitating generation of said non-payment e-merchandise related information by said first terminal electronic merchandise module; and computer usable program code for facilitating transfer of said non-payment e-merchandise related information from said first terminal electronic merchandise module to said electronic device via said first terminal payment module, within a transaction between said electronic device and said first terminal payment module that is conducted in accordance with said account number and the payment infrastructure standard, said non-payment e-merchandise related information being stored on said electronic device in accordance with said payment infrastructure standard.

38. An electronic device for facilitating integrated payment and electronic merchandise transfer via a payment infrastructure, having a payment infrastructure standard, in association with an electronic merchandise infrastructure, said electronic device being configured according to the payment infrastructure standard, said electronic device comprising:

a memory; and at least one processor coupled to said memory, said processor being operative to:

facilitate interrogation of said electronic device by a first terminal to obtain an account number associated with said electronic payment device, said first terminal having a first terminal payment module configured according to the payment infrastructure standard and a first terminal electronic merchandise module configured according to the electronic merchandise infrastructure and coupled to said first terminal payment module to permit transfer of non-payment e-merchandise related information from said first terminal electronic merchandise module to said first terminal payment module, said interrogation of said electronic device being performed by said first terminal payment module;

facilitate generation of said non-payment e-merchandise related information by said first terminal electronic merchandise module; and facilitate transfer of said non-payment e-merchandise related information from said first terminal electronic merchandise module to said electronic device via said first terminal payment module that is conducted in accordance with said account number and the payment infrastructure standard, said non-payment e-merchandise related information being stored on said electronic payment device in accordance with said payment infrastructure standard.

* * * * *

UNITED STATES PATENT AND TRADEMARK OFFICE
CERTIFICATE OF CORRECTION

PATENT NO.         : 7,374,082 B2
APPLICATION NO.    : 11/478185
DATED              : May 20, 2008
INVENTOR(S)        : Van de Velde et al.

It is certified that error appears in the above-identified patent and that said Letters Patent is hereby corrected as shown below:

Column 8, line 36, after "structure" and before "with" replace "in associated" with --in association--.

Column 9, line 46, after "amusement" and before "museums" replace "parts" with --parks--.

Column 10, line 49, after "As noted," and before "one" replace "on" with --in--.

Column 15, line 16, after "one is" replace "jut" with --just--; line 42, after "called" and before "CDOL1" delete "(".

Column 16, line 12 and line 53, after "expiry" and before "as" replace "data" with --date--.

Column 21, line 62, after "As is" and before "in the art" replace "shown" with --known--.

In claim 36, column 29, line 1, after "conducted in" and before "with" replace "according" with --accordance--; line 2, after "account" and before "and" replace "device" with --number--.

In claim 38, column 30, line 34, after "module" and before "that" insert --, within a transaction between said electronic device and said first terminal payment module--.

Signed and Sealed this
First Day of May, 2012

David J. Kappos
*Director of the United States Patent and Trademark Office*